US011677984B2

(12) United States Patent
Egilmez et al.

(10) Patent No.: US 11,677,984 B2
(45) Date of Patent: Jun. 13, 2023

(54) LOW-FREQUENCY NON-SEPARABLE TRANSFORM (LFNST) SIGNALING

(71) Applicant: QUALCOMM Incorporated, San Diego, CA (US)

(72) Inventors: Hilmi Enes Egilmez, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/993,785

(22) Filed: Aug. 14, 2020

(65) Prior Publication Data

US 2021/0058642 A1  Feb. 25, 2021

Related U.S. Application Data

(60) Provisional application No. 62/903,522, filed on Sep. 20, 2019, provisional application No. 62/889,402, filed on Aug. 20, 2019.

(51) Int. Cl.
*H04N 19/61* (2014.01)
*H04N 19/593* (2014.01)
*H04N 19/176* (2014.01)
*H04N 19/18* (2014.01)

(52) U.S. Cl.
CPC .......... *H04N 19/61* (2014.11); *H04N 19/176* (2014.11); *H04N 19/18* (2014.11); *H04N 19/593* (2014.11)

(58) Field of Classification Search
None
See application file for complete search history.

(56) References Cited

U.S. PATENT DOCUMENTS

| 10,306,229 | B2 | 5/2019 | Zhao et al. |
| 10,349,085 | B2 | 7/2019 | Said et al. |
| 10,448,053 | B2 | 10/2019 | Said et al. |
| 10,491,922 | B2 | 11/2019 | Zhao et al. |
| 10,516,885 | B1 * | 12/2019 | Li .................... H04N 19/176 |
| 10,681,379 | B2 | 6/2020 | Zhao et al. |

(Continued)

OTHER PUBLICATIONS

Lainema J. et al., "CE6-related: LFNST with one mode", JVET-O0350, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-4.

(Continued)

*Primary Examiner* — Chikaodili E Anyikire
(74) *Attorney, Agent, or Firm* — Shumaker & Sieffert, PA

(57) ABSTRACT

A method of decoding video data includes receiving encoded data for a current block and decoding N bins for a low-frequency non-separable transform (LFNST) index from the encoded data. The N bins comprises a first bin and a second bin. Decoding the N bins comprises context decoding each bin of the N bins. The method further includes determining the LFNST index using the N bins and decoding the encoded data to generate transform coefficients. The method further includes applying an inverse LFNST to the transform coefficients using the LFNST index to produce a residual block for the current block and reconstructing the current block of the video data using the residual block and a prediction block for the current block.

14 Claims, 13 Drawing Sheets

(56) References Cited

U.S. PATENT DOCUMENTS

| | | | |
|---|---|---|---|
| 10,863,199 | B2 | 12/2020 | Said et al. |
| 2015/0078443 | A1* | 3/2015 | Kolesnikov ............ H04N 19/13 |
| | | | 375/240.18 |
| 2017/0094313 | A1 | 3/2017 | Zhao et al. |
| 2017/0094314 | A1 | 3/2017 | Zhao et al. |
| 2017/0238013 | A1 | 8/2017 | Said et al. |
| 2017/0324643 | A1* | 11/2017 | Seregin ................ H04N 19/16 |
| 2017/0374369 | A1* | 12/2017 | Chuang ............... H04N 19/593 |
| 2018/0020218 | A1 | 1/2018 | Zhao et al. |
| 2019/0306521 | A1* | 10/2019 | Zhao .................... H04N 19/105 |
| 2019/0373261 | A1 | 12/2019 | Egilmez et al. |
| 2020/0177889 | A1* | 6/2020 | Kim .................... H04N 19/176 |
| 2020/0260070 | A1* | 8/2020 | Yoo ..................... H04N 19/176 |
| 2020/0304818 | A1* | 9/2020 | Koo ...................... H04N 19/44 |
| 2020/0359019 | A1* | 11/2020 | Koo ...................... H04N 19/60 |
| 2020/0366937 | A1 | 11/2020 | Egilmez et al. |
| 2020/0389666 | A1* | 12/2020 | Zhao .................... H04N 19/625 |
| 2021/0297700 | A1* | 9/2021 | Koo .................... H04N 19/593 |

OTHER PUBLICATIONS

Bross B., et al., "Versatile Video Coding (Draft 6)", JVET-O2001-v3, Joint Video Experts Team (JVET) of ITU-T SG 16 WP 3 and ISO/IEC JTC 1/SC 29/WG 11, 15th Meeting, Gothernburg, SE, Jul. 3-12, 2019, 425 pages.
Zhao X., et al., "Enhanced Multiple Transform for Video Coding", Data Compression Conference, Mar. 30, 2016, XP033027689, pp. 73-82, DOI: 10.1109/DCC.2016.9 [retrieved on Dec. 15, 2016].
Bross B., et al., "Versatile Video Coding (Draft 6)", Joint Video Experts Team (JVET) of ITU-T SG 16 WP 3 and ISO/IEC JTC 1/SC 29/WG 11, JVET-O2001-vE, Jul. 3-12, 2019, 455 pages.
Chen J., et al., "Algorithm Description for Versatile Video Coding and Test Model 6 (VTM 6)", 127th MPEG Meeting, Jul. 8, 2019, Gothenburg, (Motion Picture Expert Group or ISO/IEC JTC1/SC29/WG11), No. m49914, Joint Video Experts Team (JVET) of ITU-T SG 16 WP 3 and ISO/IEC JTC 1/SC 29/WG 11, 15th Meeting, Gothenburg, SE, Jul. 3-12, 2019, JVET-O2002-v1, Aug. 15, 2019 (Aug. 15, 2019), XP030208572, 82 Pages, Retrieved from the Internet: URL:http://phenix.int-evry.fr/mpeg/doc_end_user/documents/127_Gothenburg/wg11/m49914-JVET-O2002-v1-JVET-O2002-v1.zipJVET-O2002-v1.docx [retrieved on Aug. 15, 2019].
Chiang M., et al., "CE6-Related: Simplifications for LFNST", 15. JVET Meeting, Jul. 3, 2019-Jul. 12, 2019, Gothenburg, The Joint Video Exploration Team of ISO/IEC JTC1/SC29/WG11 and ITU-TSG.16 ), No. JVET-O0292, Jul. 7, 2019 (Jul. 7, 2019), XP030219140, 7 Pages, Retrieved from the Internet:URL:http://phenix.int-evry.fr/jvet/doc_end_user/documents/15_Gothenburg/wg11/JVET-O0292-v4.zip JVET-O0292-v3-clean.docx [retrieved on Jul. 7, 2019].
Egilmez (QUALCOMM) H E., et al., "Description of Core Experiment 6 (CE6): Transforms and Transform Signalling", 127. MPEG Meeting, Jul. 8, 2019-Jul. 12, 2019, Gothenburg, (Motion Picture Expert Group or ISO/IEC JTC1/SC29/WG11), No. m49894, Jul. 31, 2019 (Jul. 31, 2019), XP030208524, 9 Pages, Retrieved from the Internet:URL:http://phenix.int-evry.fr/mpeg/doc_end_user/documents/127_Gothenburg/wg11/m49894-JVET-O2026-v2-JVET-O2026.zip JVET-O2026-v2.docx [retrieved on Jul. 31, 2019].
Egilmez (QUALCOMM) H E., et al.,"CE6-Related: An LFNST Index Signaling with Bin Prediction", 16. JVET Meeting, Oct. 1, 2019-Oct. 11, 2019, Geneva, (The Joint Video Exploration Team of ISO/IEC JTC1/SC29/WG11 and ITU-T SG.16) No. JVET-P0568, Sep. 25, 2019 (Sep. 25, 2019), XP030217735, 5 Pages, Retrieved from the Internet:URL:http://phenix.int-evry.fr/jvet/doc_end_user/documents/16_Geneva/wg11/JVET-P0568-v1.zip JVET-P0568-v1.docx [retrieved on Sep. 25, 2019].
Fraunhofer HHI., "Transform Coding Using the Residual Quadtree (RQT)", retrieved from: http://www.hhi.fraunhofer.de/fields-of-competence/image-processing/research-groups/image-video-coding/hevc-high-etficiency-video-coding/transform-coding-using-the-residual-quadtree-rqt.html, Mar. 6, 2017, pp. 1-4.
Han J., et al., "Towards Jointly Optimal Spatial Prediction and Adaptive Transform in Video/Image Coding", IEEE International Conference on Acoustics, Speech and Signal Processing (ICASSP), Mar. 2010, pp. 726-729.
International Search Report and Written Opinion—PCT/US2020/046663—ISA/EPO—dated Oct. 30, 2020.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Jain A.K., "A Sinusoidal Family of Unitary Transforms", IEEE Transactions on Pattern Analysis and Machine Intelligence, IEEE Service Center, vol. PAMI-1, No. 4, Oct. 1, 1979, XP011242370, pp. 356-365, ISSN: 0162-8828.
Koo (LGE) M., et al., "CE6: Reduced Secondary Transform (RST) (CE6-3.1)", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0193, Mar. 27, 2019 (Mar. 27, 2019), XP030256927, pp. 1-19, Retrieved from the Internet: URL: http://phenix.int-evry.fr/jvet/doc_end_user/documents/14_Geneva/wg11/JVET-N0193-v5.zip JVET-N0193 r3.docx, [retrieved on Mar. 27, 2019].
Martucci S.A., et al., "Symmetric Convolution and the Discrete Sine and Cosine Transforms", IEEE Transactions on Signal Processing, IEEE Signal Processing Society, vol. 42, No. 5, May 1, 1994, XP000863873, pp. 1038-1051.
Nalci (QUALCOMM) A., et al., "Non-CE6: An Improved Context Modeling for LFNST", 15. JVET Meeting, Jul. 3, 2019-Jul. 12, 2019, Gothenburg, (The Joint Video Exploration Team of ISO/IEC JTC1/SC29/WG11 and ITU-TSG.16 ), No. JVET-O0373, Jul. 9, 2019 (Jul. 9, 2019), XP030219375, 3 Pages, Retrieved from the Internet:URL:http://phenix.int-evry.fr/jvet/doc_end_user/documents/15_Gothenburg/wg11/JVET-O0373-v2.zip JVET-O0373-v2.docx [retrieved on Jul. 9, 2019].
Wien M., "High Efficiency Video Coding", Coding Tools and Specification, Springer-Verlag, Berlin, 2015, 30 Pages.
U.S. Appl. No. 62/799,410, filed Jan. 31, 2019, by Hilmi Enes Egilmez et al.
Chiang M., et al., "CE6-1: LFNST with One Mode", Joint Video Experts Team (JVET) of ITU-T SG 16 WP 3 and ISO/IEC JTC 1/SC 29/WG 11, Document: JVET-P0041, 16th Meeting: Geneva, CH, Oct. 1-11, 2019, pp. 1-10.
Rosewarne C. et al., "CE6-related: RST binarisation", JVET-N0105-v1, Joint Video Experts Team (JVET) of ITU-T SG 16 WP 3 and ISO/IEC JTC 1/SC 29/WG 11, 14th Meeting: Geneva, CH, Mar. 19-27, 2019, pp. 1-2.
Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010-v1, pp. 1-6.
Said A., et al., "CE6: Summary Report on Transforms and Transform Signaling", JVET-M0026, Joint Video Experts Team (JVET) of ITU-T SG 16 WP 3 and ISO/IEC JTC 1/SC 29/WG 11, 13th Meeting, Marrakech, MA, Jan. 9-18, 2019, pp. 1-19.
Zhao X., et al., "CE6: Summary Report on Transforms and Transform Signaling", JVET-N0026-v1, Joint Video Experts Team (JVET) of ITU-T SG 16 WP 3 and ISO/IEC JTC 1/SC 29/WG 11, 14th Meeting, Geneva, CH, Mar. 19-27, 2019, pp. 1-15.
Zhao X., et al., "CE6: Summary Report on Transforms and Transform Signalling" JVET-O0026-v1, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-8.
Said A., et al., "Description of Core Experiment 6 (CE6): Transforms and Transform Signalling", Joint Video Experts Team (JVET) of ITU-T SG 16 WP 3 and ISO/IEC JTC 1/SC 29/WG 11, JVET-L1026-v3, 12th Meeting: Macao, CN, Oct. 3-12, 2018, pp. 1-14.
U.S. Appl. No. 62/668,105, filed May 7, 2018, by Amir Said.

* cited by examiner

LOW-FREQUENCY NON-SEPARABLE TRANSFORM (LFNST) SIGNALING

This application claims the benefit of U.S. Provisional Application No. 62/889,402, filed Aug. 20, 2019, and U.S. Provisional Application No. 62/903,522, filed Sep. 20, 2019, each of which is incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for transform signaling to reduce a signaling of transform-related information. Rather than context coding a first bin for a low-frequency non-separable transform (LFNST) index and bypass coding a second bin for the LFNST index, techniques described herein may context code the first bin and the second bin. By context coding additional bins for an LFNST index, the video coder (e.g., a video encoder or a video decoder) may determine an LFNST index for blocks of a picture of video data with less signaling overhead, thus potentially decreasing an amount of video data transmitted with little to no loss in prediction accuracy and/or complexity.

In one example, a method of decoding video data includes receiving encoded data for a current block and decoding N bins for a LFNST index from the encoded data. The N bins comprises a first bin and a second bin and decoding the N bins comprise context decoding each bin of the N bins. The method further includes determining the LFNST index using the N bins, decoding the encoded data to generate transform coefficients, and applying an inverse LFNST to the transform coefficients using the LFNST index to produce a residual block for the current block. The method further includes reconstructing the current block of the video data using the residual block and a prediction block for the current block.

In another example, a method of encoding video data includes generating a residual block for a current block based on a prediction block for the current block, applying a separable transform to the residual block to produce separable transform coefficients, and determining a LFNST index. The method further includes applying a LFNST to the separable transform coefficients using the LFNST index to produce transform coefficients and encoding the transform coefficients and N bins for the LFNST index to produce encoded video data. The N bins comprise a first bin and a second bin and encoding the N bins comprises context encoding each bin of the N bins. The method further includes outputting the encoded video data.

In one example, a device for decoding video data includes one or more processors implemented in circuitry and configured to receive encoded data for a current block and decode N bins for a LFNST index from the encoded data. The N bins comprise a first bin and a second bin and, to decode, the N bins, the one or more processors are configured to context decode each bin of the N bins. The one or more processors are further configured to determine the LFNST index using the N bins and decode the encoded data to generate transform coefficients. The one or more processors are further configured to apply an inverse LFNST to the transform coefficients using the LFNST index to produce a residual block for the current block and reconstruct the current block of the video data using the residual block and a prediction block for the current block.

In another example, a device for encoding video data comprises one or more processors implemented in circuitry and configured to generate a residual block for a current block based on a prediction block for the current block, apply a separable transform to the residual block to produce separable transform coefficients, and determine a LFNST index. The one or more processors are further configured to apply a LFNST to the separable transform coefficients using the LFNST index to produce transform coefficients and encode the transform coefficients and N bins for the LFNST index to produce encoded video data. The N bins comprise a first bin and a second bin and encoding the N bins comprises context encoding each bin of the N bins. The one or more processors are further configured to output the encoded video data.

In one example, an apparatus for decoding video data comprises means for receiving encoded data for a current block and means for decoding N bins for a LFNST index from the encoded data. The N bins comprise a first bin and a second bin and the means for decoding the N bins comprises means for context decoding each bin of the N bins. The apparatus further comprises means for determining the LFNST index using the N bins and means for decoding the encoded data to generate transform coefficients. The apparatus further comprises means for applying an inverse LFNST to the transform coefficients using the LFNST index to produce a residual block for the current block and means for reconstructing the current block of the video data using the residual block and a prediction block for the current block.

In another example, an apparatus for encoding video data comprises means for generating a residual block for a current block based on a prediction block for the current block and means for applying a separable transform to the residual block to produce separable transform coefficients. The apparatus further comprises means for determining a LFNST index and means for applying a LFNST to the separable transform coefficients using the LFNST index to produce transform coefficients. The apparatus further comprises means for encoding the transform coefficients and N bins for the LFNST index to produce encoded video data. The N bins comprise a first bin and a second bin and the means for encoding the N bins comprises means for context encoding each bin of the N bins. The apparatus further comprises means for outputting the encoded video data.

In one example, a computer-readable storage medium has stored thereon instructions that, when executed, cause one or more processors to receive encoded data for a current block and decode N bins for a LFNST index from the encoded data. The N bins comprise a first bin and a second bin and wherein, to decode, the N bins, the instructions further cause the one or more processors to context decode each bin of the N bins. The instructions further cause the one or more processors to determine the LFNST index using the N bins and decode the encoded data to generate transform coefficients. The instructions further cause the one or more processors to apply an inverse LFNST to the transform coefficients using the LFNST index to produce a residual block for the current block and reconstruct the current block of the video data using the residual block and a prediction block for the current block.

In another example, a computer-readable storage medium has stored thereon instructions that, when executed, cause one or more processors to generate a residual block for a current block based on a prediction block for the current block and apply a separable transform to the residual block to produce separable transform coefficients. The instructions further cause the one or more processors to determine a LFNST index and apply a LFNST to the separable transform coefficients using the LFNST index to produce transform coefficients. The instructions further cause the one or more processors to encode the transform coefficients and N bins for the LFNST index to produce encoded video data. The N bins comprise a first bin and a second bin and, to encode the N bins, the instructions further cause the one or more processors to context encode each bin of the N bins. The instructions further cause the one or more processors to output the encoded video data.

The details of one or more examples are set forth in the accompanying drawings and the description below. Other features, objects, and advantages will be apparent from the description, drawings, and claims.

DETAILED DESCRIPTION

Figure 1:
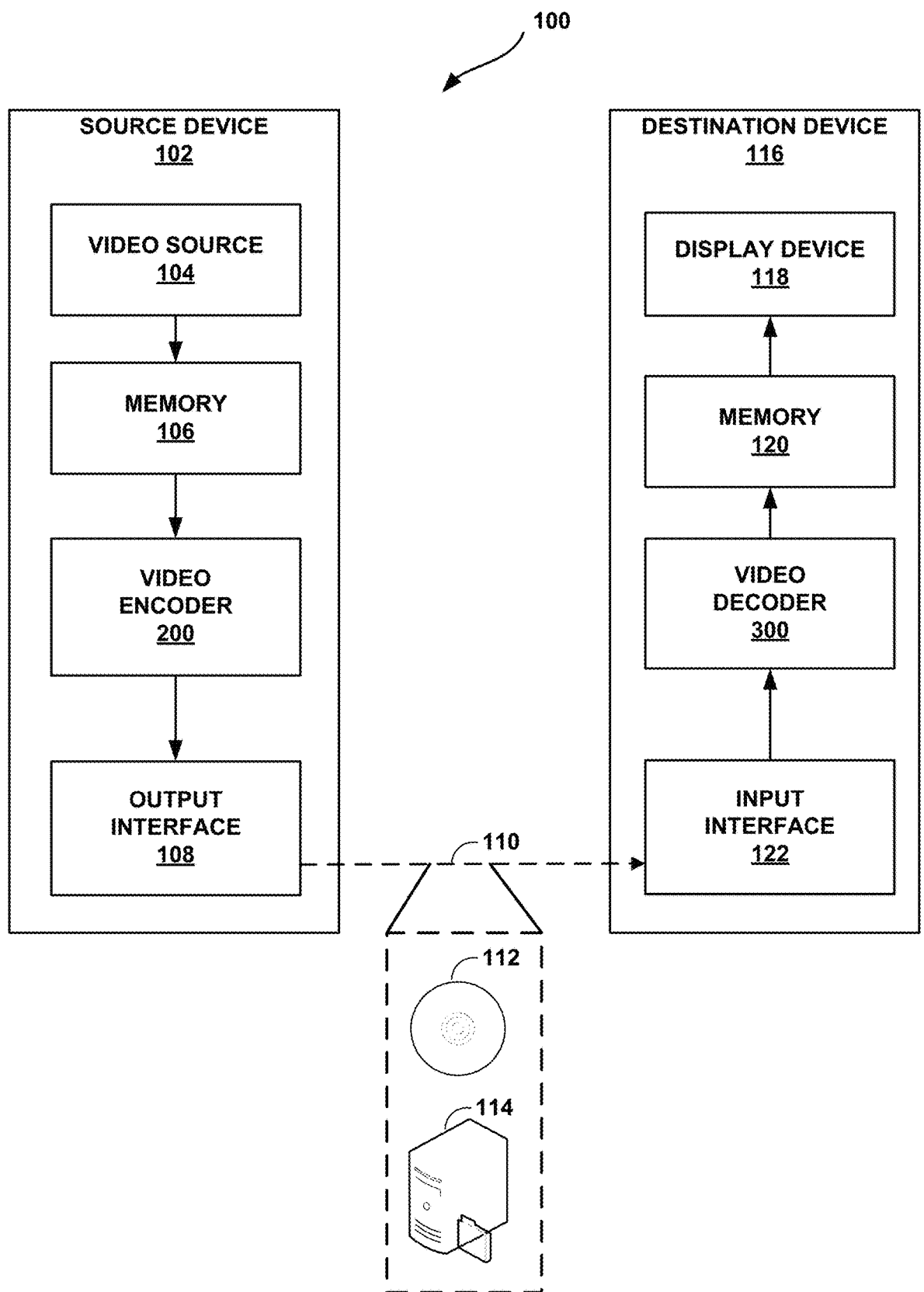
FIG. 1 is a block diagram illustrating an example video encoding and decoding system that may perform the techniques of this disclosure.

In general, this disclosure describes techniques related to low-frequency non-separable transform (LFNST). A video encoder may represent residual blocks for video data in a form suitable for signaling from the video encoder and for reception by a video decoder. It is desirable to reduce an amount of data used to represent the residual blocks such that an amount of data transmitted from the video encoder and received by the video decoder is reduced. In video coding, separable transforms have been applied over non-separable transforms because separable transforms may use fewer operations (e.g., addition, multiplication), as compared to a non-separable transform. Separable transforms are filters that can be written as a product of two or more filters. In contrast, a non-separable filter cannot be written as a product of two or more filters.

Rather than relying solely on a separable transform that converts a residual block in a pixel domain to a coefficient block in a frequency domain, a video encoder may also apply a LFNST to increase energy compaction of the transform coefficient block. For instance, the LFNST may concentrate non-zero coefficients of the transform coefficient block closer to the DC coefficient of the transform coefficient block. As a result, there may be fewer transform coefficients between the DC coefficient of the coefficient block and the last significant (i.e., non-zero) transform coefficient of the transform coefficient block, resulting in a reduced amount of data used to represent the residual block. Similarly, a video decoder may apply an inverse separable transform to transform the transform coefficient block into a residual block. In this manner, data used to represent residual blocks may be reduced, thereby reducing bandwidth and/or storage requirements for the video data, and potentially reducing energy usage of the video decoder and video encoder.

A video encoder may generate a LFNST index for a LFNST. For example, the video encoder may set the LFNST index to '0' when LFNST is disabled, '1' when LFNST is enabled (i.e., not disabled) and a first LFNST type is to be applied, and '2' when LFNST is enabled (i.e., not disabled) and a second LFNST type is to be applied. In this example, the video encoder may represent the LFNST index using a first bin (e.g., a '0' or '1') and a second bin. In some coding systems, the video encoder may context code a first bin and bypass code the second bin. For example, the video decoder may context decode the first bin to determine whether the LFNST is enabled or disabled for a current block. In this example, the video decoder may bypass decode the second bin to determine whether the LFNST is configured for a first LFNST. Context coding may refer to instances where previously decoded values (e.g., for a bin but other previously decoded values may be possible) may be used to determine a current value of the bin. Examples of context coding may include, for example, a CABAC-based arithmetic coding engine. For example, the video encoder may encode the first bin for the LFNST index based on a context model that is updated based on previously context decoded values for the first bin for the LFNST index. In contrast, bypass coding may refer to instances where previously decoded values for a bin are not used to determine a current value of the bin. For example, in CABAC-based arithmetic coding, the probability of a value of the bin being 0 or 1 is not 50%, and the context may bias the probability to be greater than or less than 50%. However, for bypass coding, the probability of a value of a bin being 0 or 1 is 50%, and no context is used to bias the probability.

In accordance with the techniques of the disclosure, a video encoder may context encode N bins for a LFNST index. The N bins may include at least a first bin and a second bin that are each context encoded (e.g., using a CABAC-based arithmetic coding engine). For example, the video encoder may context encode a first bin and a second bin for LFNST. Similarly, a video decoder may context decode N bins for a LFNST index, where the N bins include at least a first bin and a second bin that are each context coded. Context coding each of the N bins for the LFNST index may permit a video decoder to determine an LFNST index for blocks of a picture of video data with less signaling overhead, thus potentially decreasing an amount of video data transmitted with little to no loss in prediction accuracy and/or complexity.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for LFNST signaling, such as based on intra modes in some examples. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for LFNST signaling. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-02001-vE (hereinafter "VVC Draft 6") and in Bross, et al. "Versatile Video Coding (Draft 9)," Joint Video Experts Team (JVET) of ITU-T SG 16 WP 3 and ISO/IEC JTC 1/SC 29/WG 11, 18$^{th}$ Meeting: by teleconference, 15-24 Apr. 2020, JVET-R2001-v8 (hereinafter "VVC Draft 9"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

VVC may also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. VVC may provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode syntax elements representing transform coefficients in the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

To reduce an amount of data used to represent a residual block, a video coder (e.g., video encoder 200 or video decoder 300) may apply LFNST using a LFNST index. The LFNST index may be represented by N bins that includes at least a first bin and a second bin. For example, a video decoder may context decode the first bin for the LFNST index to determine whether the LFNST is enabled or disabled for a current block and bypass decode the second bin for the LFNST index to determine a type of LFNST to be applied. In this way, the video coder may potentially reduce an amount of data used to transmit a video data with little or no loss in prediction accuracy of the video data.

In accordance with the techniques of this disclosure, video encoder 200 may be configured to generate a residual block for a current block based on a prediction block for the current block and determine a LFNST index. Video encoder 200 may be configured to apply a separable transform to the residual block to produce separable transform coefficients and apply a LFNST to the separable transform coefficients using the LFNST index to produce transform coefficients. Video encoder 200 may be configured to encode the transform coefficients and N bins for the LFNST index to produce encoded video data. The N bins may comprise a first bin and a second bin. To encode the N bins, video encoder 200 may be configured to context encode each bin of the N bins. Video encoder 200 may be configured to output the encoded data.

Video decoder 300 may be configured to receive encoded data for a current block and decode N bins for a LFNST index from the encoded data. The N bins may comprise a first bin and a second bin. To decode, the N bins, video decoder 300 may be configured to context decode each bin of the N bins. Video decoder 300 may be configured to determine the LFNST index using the N bins and decode the encoded data to generate transform coefficients. Video decoder 300 may be configured to apply an inverse LFNST to the transform coefficients using the LFNST index to produce a residual block for the current block and reconstruct the current block of the video data using the residual block and a prediction block for the current block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
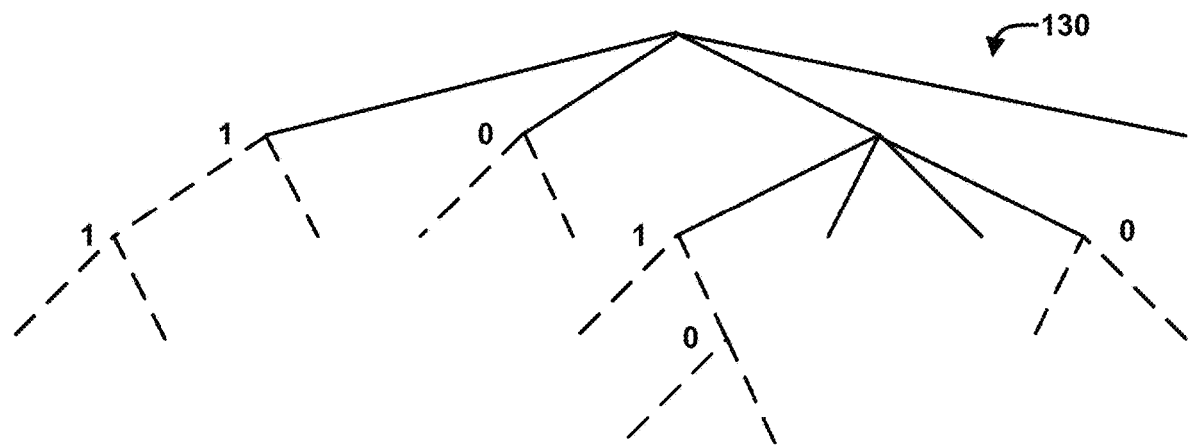
FIGS. 2A and 2B are conceptual diagrams illustrating an example quadtree binary tree (QTBT) structure, and a corresponding coding tree unit (CTU).
Figure 2B:
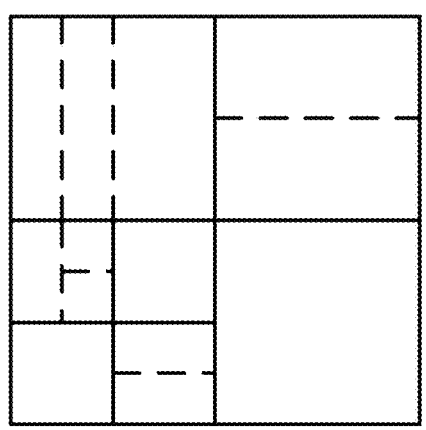

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level (i.e., the first level) of QTBT structure 290 (i.e., the solid lines) and syntax elements (such as splitting information) for a prediction tree level (i.e., the second level) of QTBT structure 290 (i.e., the dashed lines). Video encoder 200 may encode, and video decoder 300 may decode, video data, such as prediction and transform data, for CUs represented by terminal leaf nodes of QTBT structure 290.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBT- Depth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, it will not be further split by the binary tree, since the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs and are further processed according to prediction and transform without further partitioning.

Figure 3:
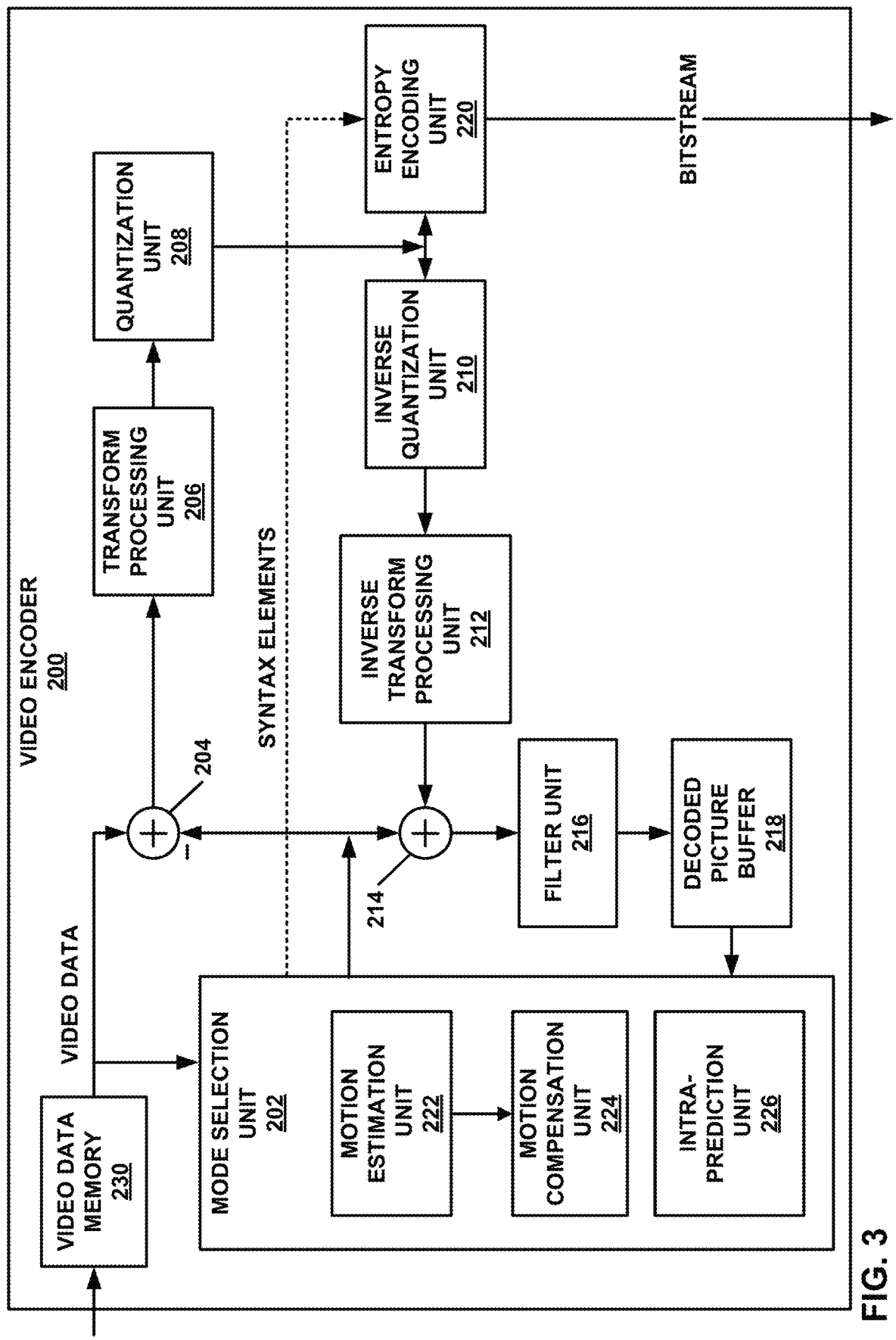
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Mode selection unit 202 may be configured to determine an LFNST index. For example, mode selection unit 202 may determine whether to enable LFNST or disable LFNST for a block of video data based on a compression rate of the block. Mode selection unit 202 may determine a LFNST type to be applied for a block. For example, mode selection unit 202 may determine to apply a first LFNST type when the first LFNST type has a greater compression rate than the second LFNST type. In some examples, mode selection unit 202 may determine to apply a second LFNST type when the first LFNST type does not have a greater compression rate than the second LFNST type.

Mode selection unit 202 may be configured to determine the LFNST index for a block based on whether LFNST is enabled for the block and/or based on whether the first LFNST type or the second LFNST type has been selected for the block. For example, mode selection unit 202 may set the LFNST index to '0' when LFNST is disabled, '1' when LFNST is enabled (i.e., not disabled) and a first LFNST type is to be applied, and '2' when LFNST is enabled (i.e., not disabled) and a second LFNST type is to be applied.

Entropy encoding unit 220 may represent the LFNST index using N bins. In some examples, the N bins may include a first bin (e.g., a '0' or '1') and a second bin. Entropy encoding unit 220 may context encode each bin of the N bins. That is, entropy encoding unit 220 may context encode the first bin and the second bin for the LFNST index. Examples of context encoding may include, for example, a CABAC-based arithmetic coding engine. For example, entropy encoding unit 220 may context encode the first bin for the LFNST index based on a context model that is updated based on previously context encoded values for the first bin for the LFNST index. In contrast, bypass coding may refer to instances where previously encoded values for a bin are not used to determine a current value of the bin. Similarly, entropy encoding unit 220 may context encode the second bin for the LFNST index based on a context model that is updated based on previously context encoded values for the second bin for the LFNST index. For instance, entropy coding unit 220 may context encode the first bin to indicate '0' when the LFNST index is '0' and a '1' when the LFNST index is '1' or '2'. Entropy coding unit 220 may context encode the second bin to indicate a '0' when the LFNST index is '1' and a '1' when the LFNST index is '2'.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Transform processing unit 206 may apply a separable transform to the residual block output by residual generation unit 204. In this example, transform processing unit 206 may apply a LFNST to transform coefficients using the LFNST index to produce transform coefficients for the current block. For example, transform processing unit 206 may apply a LFNST configured for a first LFNST type in response to determining that LFNST is enabled and the LFNST is configured for the first LFNST type (e.g., when the LFNST index is '1') and apply a LFNST configured for a second LFNST type in response to determining that LFNST is enabled and the LFNST is configured for the second LFNST type (e.g., when the LFNST index is '2'). In some examples, the first LFNST type may zero-out both Z highest frequency coefficients in a LFNST region and the multiple transform selection coefficients outside of the LFNST region (see FIG. 6) and the second LFNST type may zero-out only the multiple transform selection coefficients outside of the LFNST region (See FIG. 7).

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 may represent an example of a device configured to generate a residual block using video data for a current block base on a prediction block for the current block and determine a LFNST index. Video encoder 200 may be configured to apply a separable transform to the residual block to produce separable transform coefficients and apply a LFNST to the separable transform coefficients using the LFNST index to produce transform coefficients. Video encoder 200 may be configured to encode the transform coefficients and N bins for the LFNST index to produce encoded video data. The N bins may comprise a first bin and a second bin. To encode the N bins, video encoder 200 may be configured to context encode each bin of the N bins. Video encoder 200 may be configured to output the encoded data.

Figure 4:
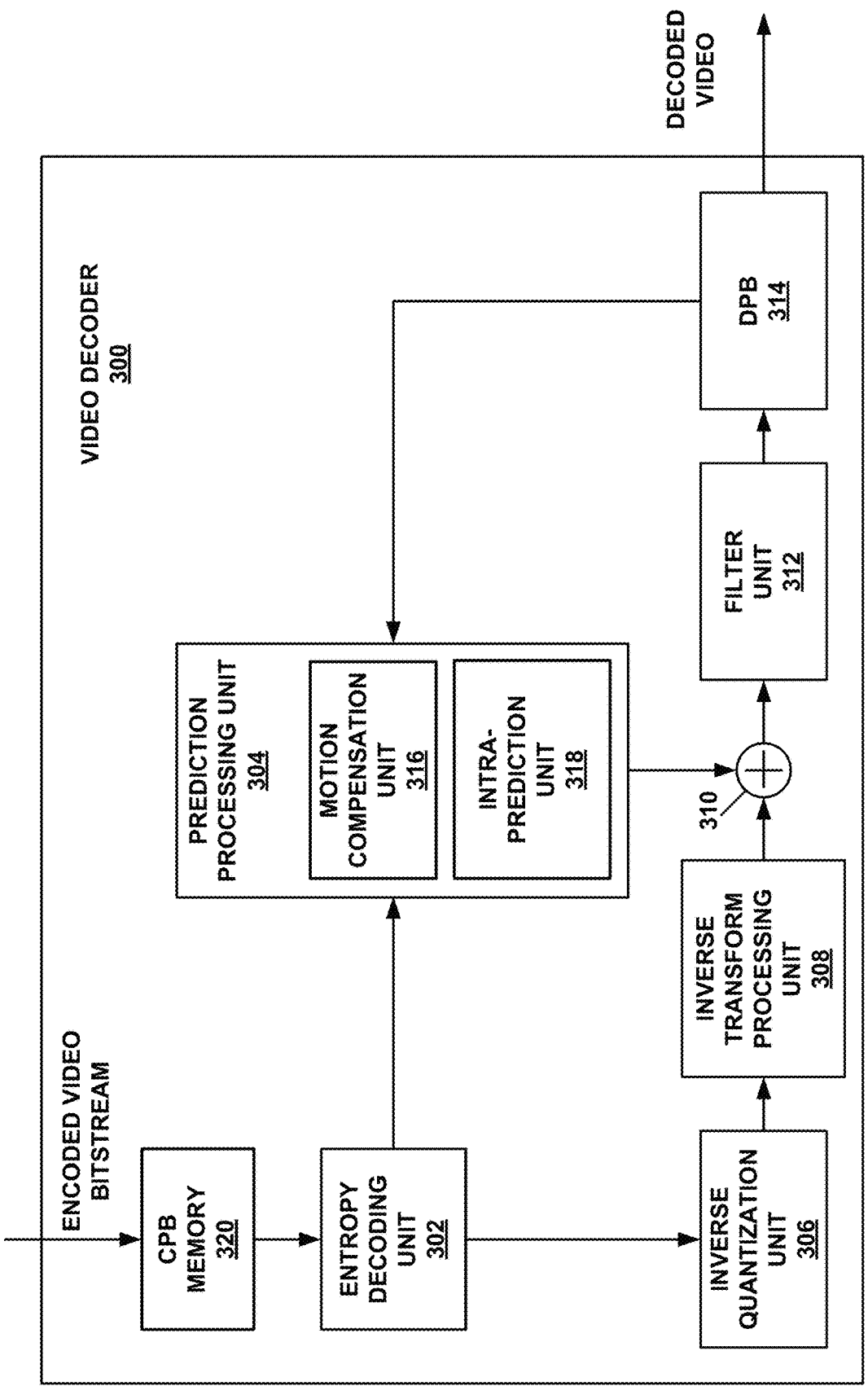
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

Entropy decoding unit 302 may decode N bins for a LFNST index. In some examples, the N bins may include a first bin and a second bin. Entropy decoding unit 302 may context decode each bin of the N bins. That is, entropy decoding unit 302 may context decode the first bin and the second bin for the LFNST index. For instance, entropy decoding unit 302 may context decode the first bin for the LFNST index based on a context model that is updated based on previously context decoded values for the first bin for the LFNST index. Similarly, entropy decoding unit 302 may context decode the second bin for the LFNST index based on a context model that is updated based on previously context decoded values for the second bin for the LFNST index.

Prediction processing unit 304 may be configured to determine the LFNST index using the N bins. For example, prediction processing unit 304 may determine that a LFNST index is '0' when the first bin is '0', '1' when the first bin is '1' and the second bin is '0' and '2' when the first bin is '1' and the second bin is '1'.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Inverse transform processing unit 308 may apply an inverse LFNST to transform coefficients using the LFNST index to produce a residual block for the current block. For example, inverse transform processing unit 308 may apply an inverse LFNST configured for a first LFNST type when the LFNST index is '1' and apply an inverse LFNST configured for a second LFNST type when the LFNST index is '2'. In some examples, inverse transform processing unit 308 may apply an inverse separable transform to the transform coefficients after applying the LFNST to produce the residual block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to receive encoded data for a current block and decode N bins for a LFNST index from the encoded data. The N bins comprises a first bin and a second bin. To decode, the N bins, video decoder 300 may be configured to context decode each bin of the N bins. Video decoder 300 may be configured to determine the LFNST index using the N bins and decode the encoded data to generate transform coefficients. Video decoder 300 may be configured to apply an inverse LFNST to the transform coefficients using the LFNST index to produce a residual block for the current block and reconstruct the current block of the video data using the residual block and a prediction block for the current block.

This disclosure is related to transform coding, which is part of most modern video compression standards, such as, but not limited to M. Wien, High Efficiency Video Coding: Coding Tools and Specification, Springer-Verlag, Berlin, 2015. This disclosure describes various transform signaling processes that can be used in a video coder to specify the transform selected among multiple transform candidates for encoding/decoding. A video coder (e.g., video encoder 200 and video decoder 300) may be configured to apply techniques described herein to reduce the signaling overhead based on available side information such as intra mode type, and therefore may improve coding efficiency and/or may be used in advanced video codecs including extensions of HEVC and the next generation of video coding standards such as VVC.

In video coding standards prior to HEVC, only a fixed separable transform is used where DCT-2 is used both vertically and horizontally. In HEVC, in addition to DCT-2, DST-7 is also employed for 4×4 blocks as a fixed separable transform.

U.S. Pat. No. 10,306,229, U.S. Patent Application Pub. No. US 2018/0020218, and U.S. patent application Ser. No. 16/426,749, which are each incorporated by reference herein, describe multiple transform selection (MTS) methods. MTS is previously called Adaptive Multiple Transforms (AMT), which is only a name change and the technique may be the same.

An example of MTS described in U.S. patent application Ser. No. 16/426,749 has been adopted in the Joint Experimental Model (JEM-7.0) of the Joint Video Experts Team (WET) of ITU-T SG 16 WP 3 and ISO/IEC JTC 1/SC 29/WG 11, JEM Software, https://jvet.hhi.fraunhofer.de/svn/svn_HMJEMSoftware/tags/HM-16.6-JEM-7.0, and later a simplified version of MTS is adopted in VVC (hereinafter, "JEM-7.0").

Figure 5:
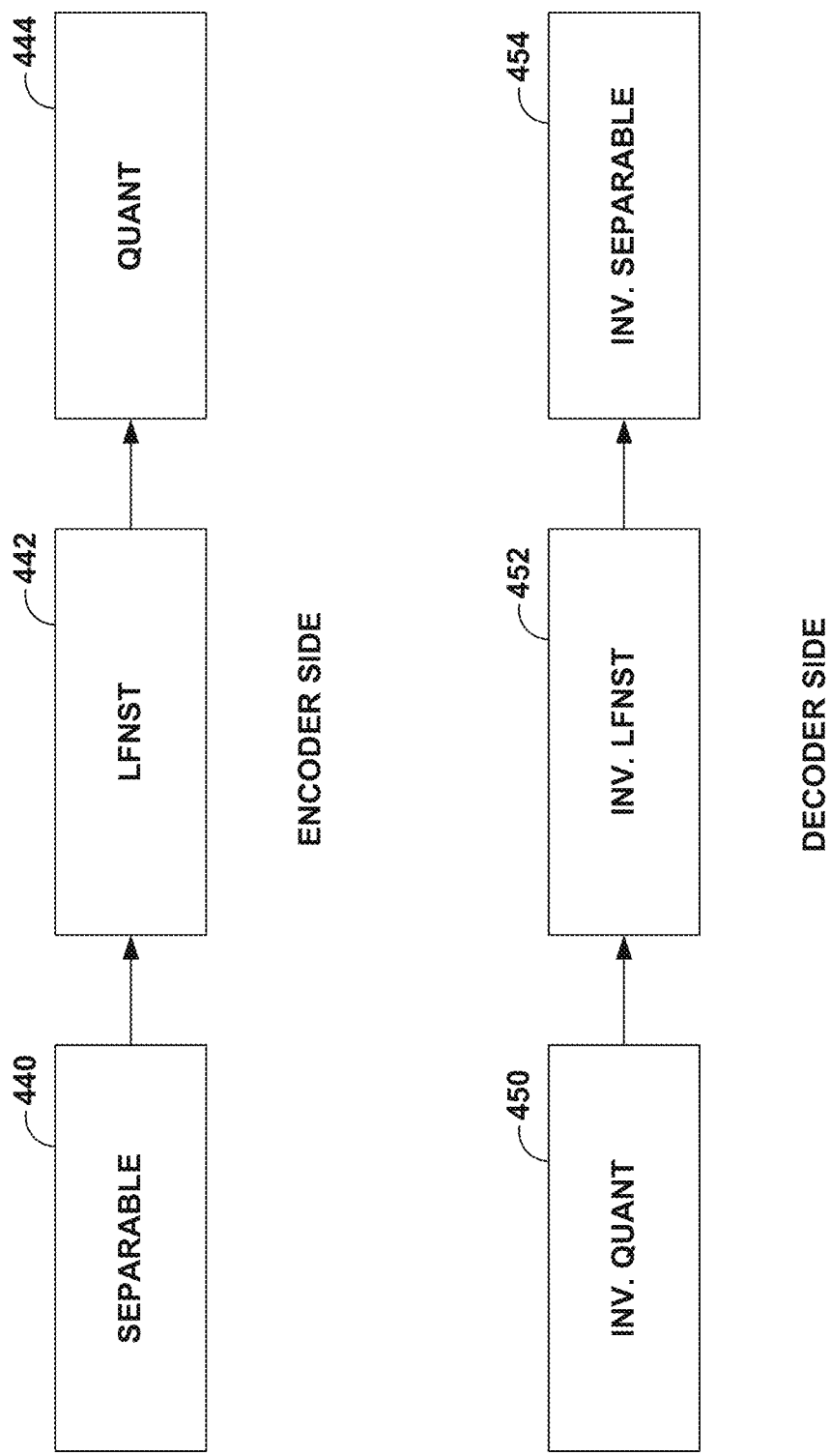
FIG. 5 is a conceptual diagram illustrating a Low-Frequency Non-Separable Transform (LFNST) transform at encoder and decoder sides where LFNST is a stage between separable transformation and quantization.

Low-Frequency Non-separable Transformation (LFNST), illustrated in FIG. 5, is used in JEM-7.0 to further improve the coding efficiency of MTS, where an implementation of LFNST is based on an example described in U.S. Patent Application Pub. No. US 2017/0238013, which is incorporated herein by reference, (see also U.S. Patent Application Pub. No. US 2017/0094313, U.S. Patent Application Pub. No. US 2017/0094314, U.S. Pat. No. 10,349,085, and Patent application Ser. No. 16/364,007, each of which is incorporated herein by reference, for alternative or additional designs and further examples). Recently, LFNST has been adopted in JVET-N0193, Reduced Secondary Transform (RST) (CE6-3.1), Online available: http://phenix.it-sudparis.eu/jvet/doc_end_user/documents/14_Geneva/wg11/JVET-N0193-v5.zip. LFNST is previously called non-separable secondary transform (NSST) or secondary transform, where LFNST, NSST, and secondary transform may be the same.

FIG. 5 is a conceptual diagram illustrating a Low-Frequency Non-Separable Transform (LFNST) transform at encoder and decoder sides where LFNST is a stage between separable transformation and quantization. In the example of FIG. 5, video encoder 200 (e.g., transform processing unit 206 of video encoder 200), may apply a separable transform 440 to coefficients of a residual block to generate separable transform coefficients and then may apply a LFNST 442 to the separable transform coefficients to generate transform coefficients. Video encoder 200 (e.g., quantitation unit 208 of video encoder 200) may apply quantization 444 to the transform coefficients to generate quantized transform coefficients.

In the example of FIG. 5, video decoder 300, or more specifically, inverse quantization unit 306 of video decoder 300, may apply inverse quantization 450 to quantized transform coefficients to generate transform coefficients. In this example, video decoder 300, or more specifically, inverse transform processing unit 308 of video decoder 300 may apply an inverse LFNST 452 to the transform coefficients to generate separable transform coefficients and may apply an inverse separable transform 454 to the separable transform coefficients to generate a residual block. Separable transform 440 may convert residual samples of a residual block from a pixel domain to separable transform coefficients in a frequency domain. Inverse separable transform 454 may convert separable transform coefficients in the frequency domain to residual samples of the residual block in the pixel domain. LFNST 442 may be used for better energy compaction of transform coefficients.

Figure 6:
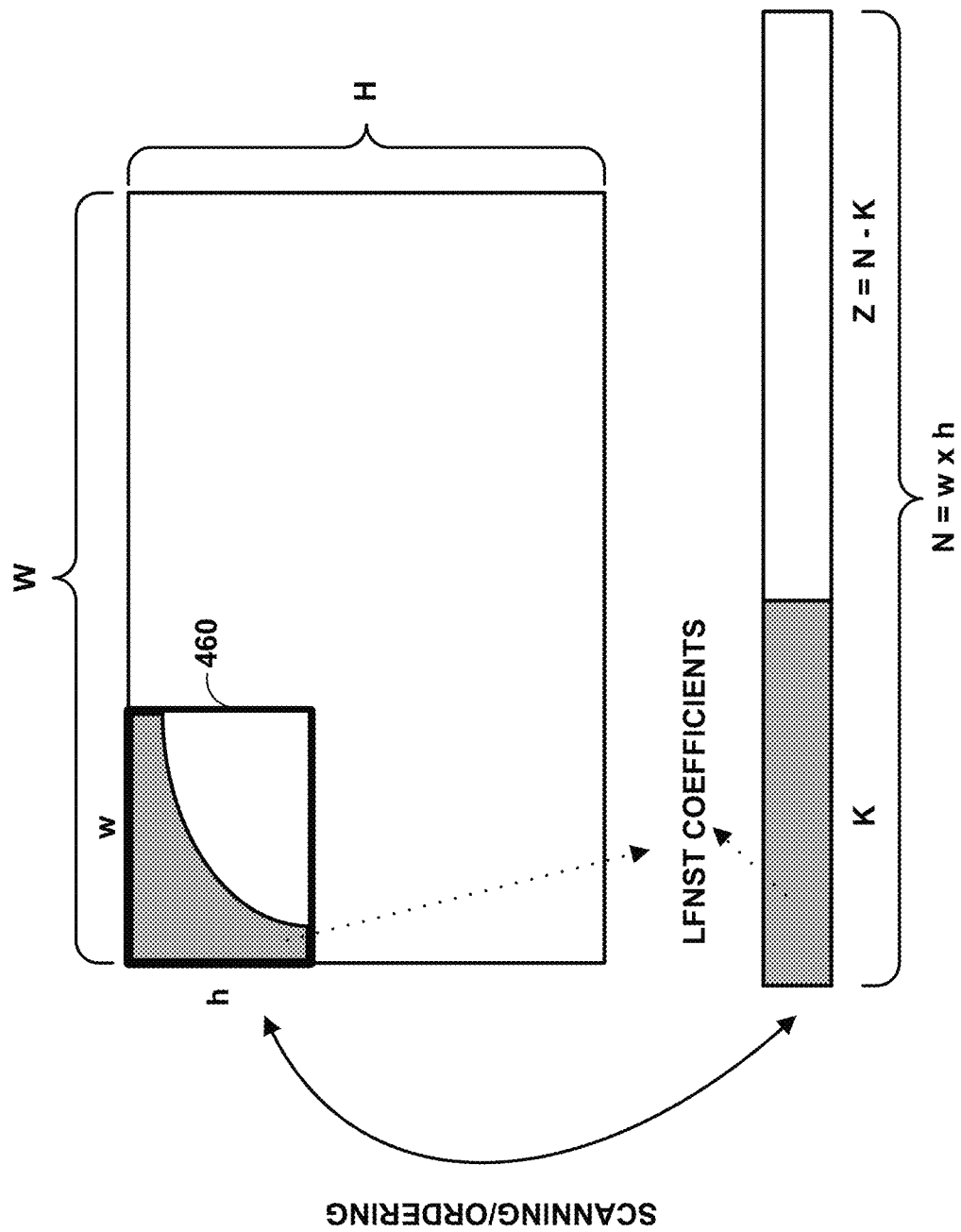
FIG. 6 is a conceptual diagram illustrating LFNST coefficients obtained by applying LFNST and zeroing-out both the Z highest frequency coefficients in a LFNST region and the multiple transform selection (MTS) coefficients outside of the LFNST region.
Figure 7:
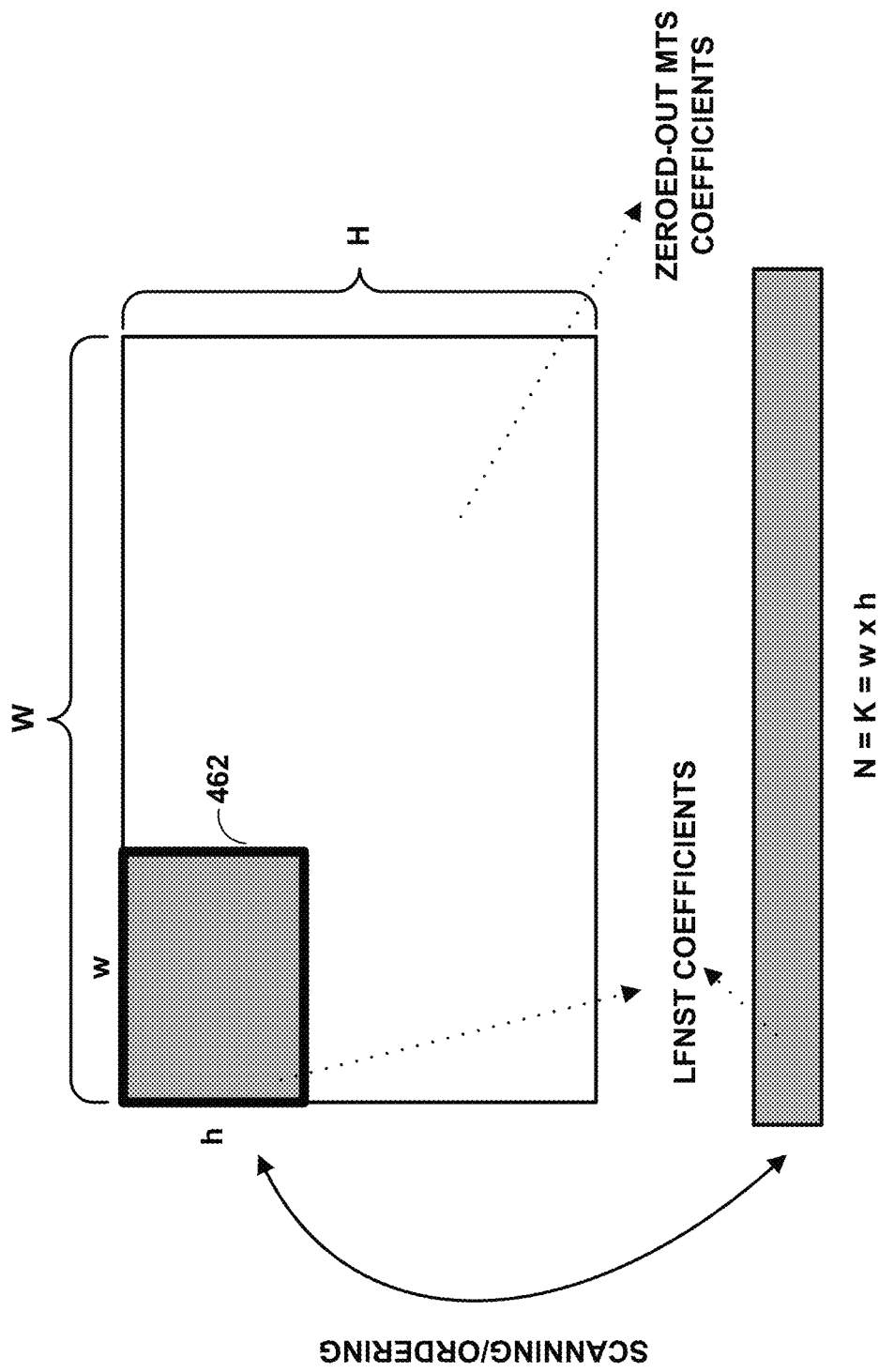
FIG. 7 is a conceptual diagram illustrating LFNST coefficients by applying LFNST and only zeroing-out MTS coefficients outside of the LFNST region.

FIG. 6 is a conceptual diagram illustrating LFNST coefficients obtained by applying LFNST and zeroing-out both the Z highest frequency coefficients in a LFNST region 460 and the MTS coefficients outside of LFNST region 460. FIG. 7 is a conceptual diagram illustrating LFNST coefficients by applying LFNST and only zeroing-out MTS coefficients outside of LFNST region 462.

In the current LFNST design in VVC Draft 6, a video encoder (e.g., video encoder 200) can perform a zero-out operation that keeps the K-lowest frequency coefficients transformed by LFNST of size N (e.g., N=64 for 8×8), and a video decoder (e.g., video decoder 300) reconstructs the separable coefficients (e.g., MTS coefficients) by only using those K coefficients. In VVC Draft 6, such zero-out process is done only for LFNST of sizes 4×4 and 8×8 normatively, where video decoder 300 implicitly infers (e.g., determines without signaling) that the remaining N−K higher frequency coefficients are set to zeros and K LFNST coefficients are used for reconstruction. FIGS. 6 and 7 illustrate the transform coefficients obtained after applying an LFNST with zero-out on top of a subset of separable transform coefficients (e.g., MTS coefficients within the sub-block marked "LFNST region") while the remaining coefficients (e.g., MTS coefficients outside of the sub-block marked "LFNST region") are normatively set to zeros. As discussed in U.S. Patent Application Pub. No. US 2017/0094313, U.S. Patent Application Pub. No. US 2017/0094314, and Patent Application No. 62/849,689, each of which is incorporated herein by reference, video encoder 200 or video decoder 300 may perform LFNST by first converting a 2-D block (e.g., LFNST region 460 of FIG. 6 or LFNST region 462 of FIG. 7) into a 1-D list (or vector) of coefficients via pre-defined scanning/ordering and then applying the transform on a subset of coefficients.

In VVC Draft 6, the LFNST index can be 0, 1 or 2 so that the LFNST index is binarized using 2 bins. That is, video encoder 200 may encode N bins for a LFNST index to produce encoded data, wherein the N bins comprises a first bin and a second bin (i.e., two bins). Similarly, video decoder 300 may decode N bins for a LFNST index to produce encoded data, wherein the N bins comprises a first bin and a second bin (i.e., two bins). The first bin is context coded and the second bin is bypass coded. This disclosure describes various processes to reduce signaling overhead of LFNST index/flag. In some examples, the various processes may be intra-mode dependent (e.g., dependent upon the type of intra-mode applied to encode or decode a current block). Although the signaling processes disclosed in this disclosure are tailored to the LFNST, the signaling processes are not limited to LFNST and can be applied to reduce signaling of transform-related syntax.

This disclosure describes the following transform signaling methods that may be used individually or in any combination.

Video encoder 200 and video decoder 300 may be configured to code the LFNST flag/index using N bins. For example, video encoder 200 and video decoder 300 may be configured to context code (e.g., encode or decode) each bin (e.g., using a CABAC-based arithmetic coding engine). As one example, video encoder 200 and video decoder 300 may be configured to context code each bin for a LFNST flag/index. That is, video encoder 200 may be configured to encode the N bins for the LFNST index, where the N bins comprises a first bin and a second bin and where to encode the N bins, video encoder 200 is configured to context encode each bin of the N bins. Similarly, video decoder 300 may be configured to decode the N bins for the LFNST index, where the N bins comprises a first bin and a second bin and where to decode the N bins, video decoder 300 is configured to context decode each bin of the N bins.

Video encoder 200 and video decoder 300 may be configured to context code a subset of bins while the rest of the bins may be bypass coded. For example, video encoder 200 and video decoder 300 may be configured to context code each bin of a subset of bins for a LFNST flag/index, where the subset is less than all of the bins for the LFNST flag/index. In some examples, video encoder 200 and video decoder 300 may be configured to code bypass code each bin.

The following describes some example techniques for context-based coding of any bin. In some examples, video encoder 200 and video decoder 300 may be configured to use separate contexts associated with luma and chroma channels. For example, video encoder 200 may, in response to determining that the first bin of the N bins is assigned to a luma channel, encode the first bin of the N bins with a first context. Similarly, video encoder 200 may, in response to determining that the second bin of the N bins is assigned to the luma channel, encode the second bin of the N bins with the first context. In some examples, video encoder 200 may, in response to determining that the first bin of the N bins is assigned to a chroma channel, encode the first bin of the N bins with a second context different from the first context. Similarly, video encoder 200 may, in response to determining that the second bin of the N bins is assigned to the chroma channel, encode the second bin of the N bins with the second context that is different from the first context.

Video decoder 300 may, in response to determining that the first bin of the N bins is assigned to a luma channel, decode the first bin of the N bins with a first context. Similarly, video decoder 300 may, in response to determining that the second bin of the N bins is assigned to the luma channel, encode the second bin of the N bins with the first context. In some examples, video decoder 300 may, in response to determining that the first bin of the N bins is assigned to a chroma channel, encode the first bin of the N bins with a second context different from the first context. Similarly, video decoder 300 may, in response to determining that the second bin of the N bins is assigned to the chroma channel, encode the second bin of the N bins with the second context that is different from the first context.

Video encoder 200 and video decoder 300 may be configured to use separate contexts for different type of block partition modes (e.g., dual-tree, single tree or other TU/CU-level partitions).

Figure 8:
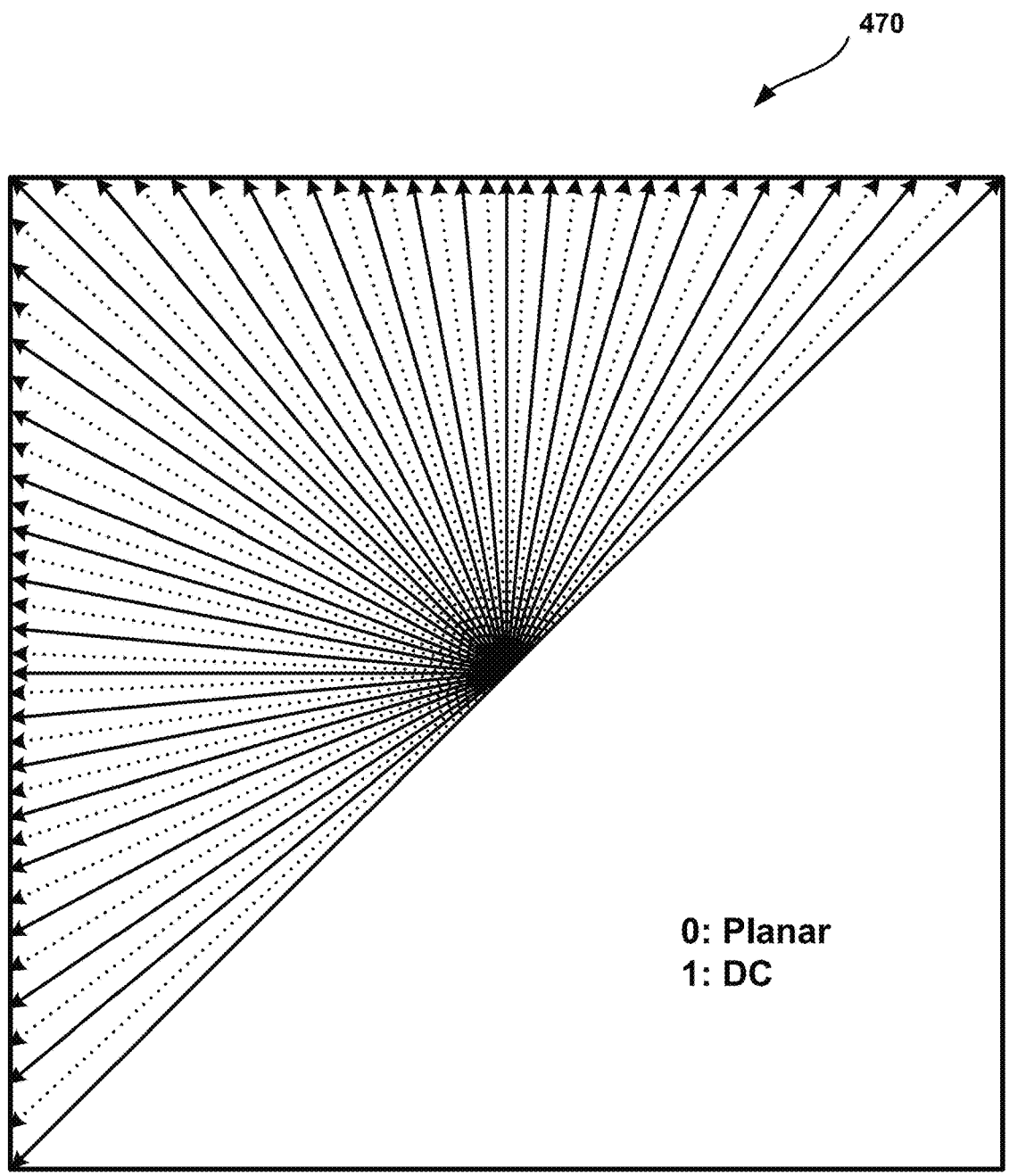
FIG. 8 is a conceptual diagram illustrating 65 angular intra modes.
Figure 9:
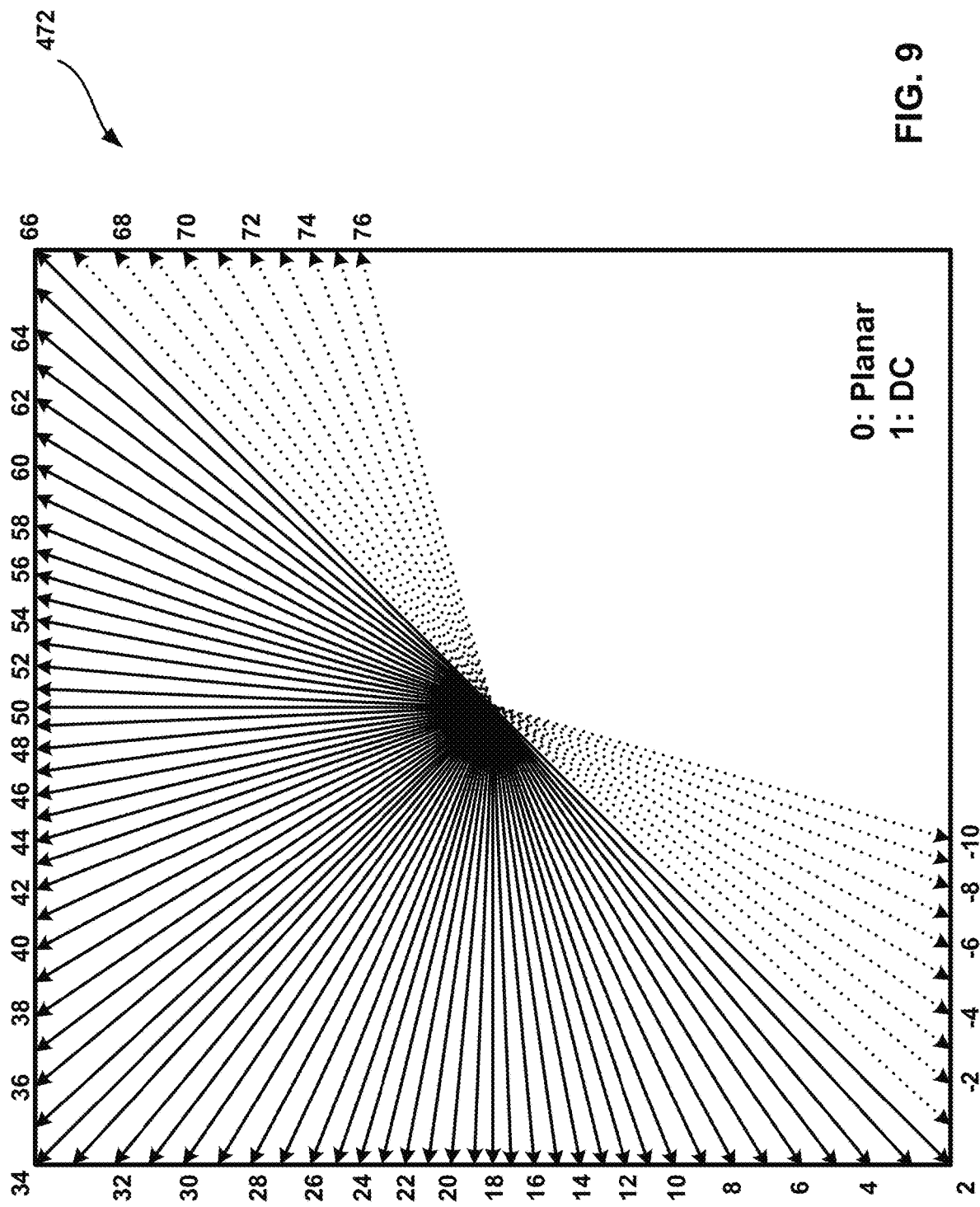
FIG. 9 is a conceptual diagram illustrating angular modes with wide angles in addition 65 modes.

Video encoder 200 and video decoder 300 may be configured to use separate contexts for different intra-modes (see, for example, FIGS. 8 and 9). FIG. 8 is a conceptual diagram illustrating 65 angular intra modes 470. FIG. 9 is a conceptual diagram illustrating angular modes with wide angles 472 (−1 to −10, and 67 to 76) in addition 65 modes.

In some examples, video encoder 200 and video decoder 300 may be configured to use one context for planar mode and use another context for the rest of the modes. In some examples, video encoder 200 and video decoder 300 may be configured to share a single context for planar and DC modes. For example, video encoder 200 and video decoder 300 may be configured to use a particular context for both a planar mode and a DC mode.

Video encoder 200 and video decoder 300 may be configured to use a subset of angular modes that share a single context. Angular modes with a similar orientation may share a single context, where similarity can be a measure of proximity between angular modes. As an example, a threshold value T can specify the number of neighboring modes that are grouped to share a single context. For example, T=3 can indicate that 4 nearest modes to the horizontal mode (i.e., mode 18 in FIG. 9) can share a single context (i.e., modes from 15-21 can share the same context).

Video encoder 200 and video decoder 300 may be configured to group alternating modes indices to share the same context. For example, video encoder 200 and video decoder 300 may be configured such that even numbered modes ( . . . −4, −2, 0, 2, 4, . . . ) may share one context, and odd numbered modes ( . . . −3, −1, 1, 3, . . . ) may use another context. Video encoder 200 and video decoder 300 may be configured to use a look-up table to determine the group of modes that share the same context where each index correspond to a mode. For example, Table=[0, 0, 1, 2, 1, 2, 1, 2, . . . , 1, 2] shows that context with index 0 is used for Planar and DC. Context 1 and 2 are used for even and odd numbered angular modes, respectively.

For coding a bin, video encoder 200 and video decoder 300 may be configured to use a single context for all intra modes, but the bin value can be predicted or modified depending on the mode information. That is, video encoder 200 may be configured to use a context that is the same for all intra modes and encode, using the context, a bin value based on intra mode information for a respective bin of the N bins. Video decoder 300 may be configured to use a context that is the same for all intra modes and predict a bin value based on intra mode information for a respective bin of the N bins.

Video encoder 200 and video decoder 300 may be configured to flip a bin value 0 or 1 (e.g., 0 can be flipped to value 1) for certain modes. For example, video encoder 200 and video decoder 300 may be configured to flip the value 0 (resp. 1) of a bin to 1 (resp. 0) for odd numbered intra modes, while for even numbered modes video encoder 200 and video decoder 300 may code (e.g., decode or encode) the value without any For example, video encoder 200 may be configured to determine a value for an intra mode for encoding the current block and determine a value for the last bin of the N bins (e.g., a second bin). In this example, video encoder 200 may be configured to context encode a value of the last bin of the N bins based on the value for the intra mode.

Video decoder 300 may be configured to determine a value for an intra mode for decoding the current block and context decode a value for the last bin of the N bins to generate a decoded value. In this example, video decoder 300 may be configured to determine the value of the last bin based on the decoded value and the value for the intra mode.

For example, video encoder 200 may be configured to determine whether the value for the intra mode is odd. In response to determining that the value for the intra mode is not odd, video encoder 200 may context encoding the value of the last bin. For instance, video encoder 200 may context encode, in response to determining that the value for the intra mode is not odd, the encoded value as '0' when the value of the last bin is '0' and context encode the encoded value as '1' when the value of the last bin is '1'. In response, however, to determining that the value for the intra mode is odd, video encoder 200 may context encode a value opposite to the value of the last bin. For instance, video encoder 200 may context encode, in response to determining that the value for the intra mode is odd, the encoded value as '1' when the value of the last bin is '0' and context encode the encoded value as '0' when the value of the last bin is '1'.

Video decoder 300 may be configured to determine whether the value for the intra mode is odd. In response to determining that the value for the intra mode is not odd, video decoder 300 may predict the value of the last bin as the decoded value. For instance, video decoder 300 may predict, in response to determining that the value for the intra mode is not odd, the value of the last bin as '0' when the decoded value for the last bin is '0' and the value of the last bin as '1' when the decoded value for the last bin is '1'. In response, however, to determining that the value for the intra mode is odd, video decoder 300 may predict the value of the last bin as a value opposite to the decoded value. For instance, video decoder 300 may predict, in response to determining that the value for the intra mode is not odd, the value of the last bin as '1' when the decoded value for the last bin is '0' and the value of the last bin as '0' when the decoded value for the last bin is '1'.

Video encoder 200 may be configured to determine whether the value for the intra mode is even. In response to determining that the value for the intra mode is not even, video encoder 200 may context encode the encoded value as the value of the last bin. For instance, video encoder 200 may context encode, in response to determining that the value for the intra mode is not even, the encoded value as '0' when the value of the last bin is '0' and context encode the encoded value as '1' when the value of the last bin is '1'. In response, however, to determining that the value for the intra mode is even, video encoder 200 may context encode the encoded value as a value opposite to the value of the last bin. For instance, video encoder 200 may context encode, in response to determining that the value for the intra mode is even, the encoded value as '1' when the value of the last bin is '0' and context encode the encoded value as '0' when the value of the last bin is '1'.

Video decoder 300 may be configured to determine whether the value for the intra mode is even. In response to determining that the value for the intra mode is not even, video decoder 300 may predict the value of the last bin as the decoded value. For instance, video decoder 300 may predict, in response to determining that the value for the intra mode is not even, the value of the last bin as '0' when the decoded value for the last bin is '0' and the value of the last bin as '1' when the decoded value for the last bin is '1'. In response, however, to determining that the value for the intra mode is even, video decoder 300 may predict the value of the last bin as a value opposite to the decoded value. For instance, video decoder 300 may predict, in response to determining that the value for the intra mode is not even, the value of the last bin as '1' when the decoded value for the last bin is '0' and the value of the last bin as '0' when the decoded value for the last bin is '1'.

In some examples, video encoder 200 and video decoder 300 may be configured to introduce an LFNST index predictor based on the intra mode information. For example, video encoder 200 and video decoder 300 may be configured to create a look-up table to map an intra prediction mode to a most probable LFNST index or LFNST kernel, which is used as a predictor. To indicate the LFNST kernel, instead of signaling the LFNST index directly, video encoder 200 and video decoder 300 may be configured to signal other information indicating whether the index is equal to the predictor. In a case of binary choice, e.g. only two choices of LFNST is possible, video encoder 200 and video decoder 300 may be configured to derive the actual LFNST kernel from the other information indicating whether the index is equal to the predictor. If index is equal to the predictor, video encoder 200 and video decoder 300 may be configured to determine the kernel is equal to the kernel from the look-up table. Otherwise, video encoder 200 and video decoder 300 may determine that the kernel is equal to the other (not the predictor) kernel. This example can be extended to more than 2 choices (e.g., more than two choices of LFNST). In such examples, if the LFNST index or kernel is not equal to the predictor, video encoder 200 may be configured to signal the information to indicate the LFNST choice from the set of choices where the predictor choice is removed.

In VVC, above techniques (individually or in any combination) can be applied for coding the second (last) bin of LFNST index (which is currently bypass coded in VVC Draft 6).

As specific example for, VVC Draft 6 (e.g., an example described in U.S. Patent Application Pub. No. US 2017/0238013, which is incorporated herein by reference), one signaling approach may be as follows:

Video encoder 200 and/or video decoder 300 may be configured to context code the last bin of LFNST index (last_lfnst_bin).

Video encoder 200 and/or video decoder 300 may be configured to predict the value of the last bin depending on intra mode (e.g., predModeIntra) as follows:
if (predModeIntra % 2==0)
predicted_last_lfnst_bin=last_lfnst_bin
 else
predicted_last_lfnst_bin=!(last_lfnst_bin)
where "!" denotes to flip/negation operation, so that it flips/negates the signaled last_lfnst_bin value to obtain the predicted last bin predicted_last_lfnst_bin if predModeIntra is an odd number. Otherwise, if predModeIntra is even, the signaled last bin is used as is.

In another example, video encoder 200 and/or video decoder 300 may be configured to predict and/or flip the bin based on the following:
if (predModeIntra % 2==1)
predicted_last_lfnst_bin=last_lfnst_bin
 else
predicted_last_lfnst_bin=!(last_lfnst_bin)
where the bin value (e.g., last_lfnst_bin) can be flipped if predModeIntra is an even number, unlike the previous example in which the bin value is flipped if predModeIntra is an odd number.

Figure 10:
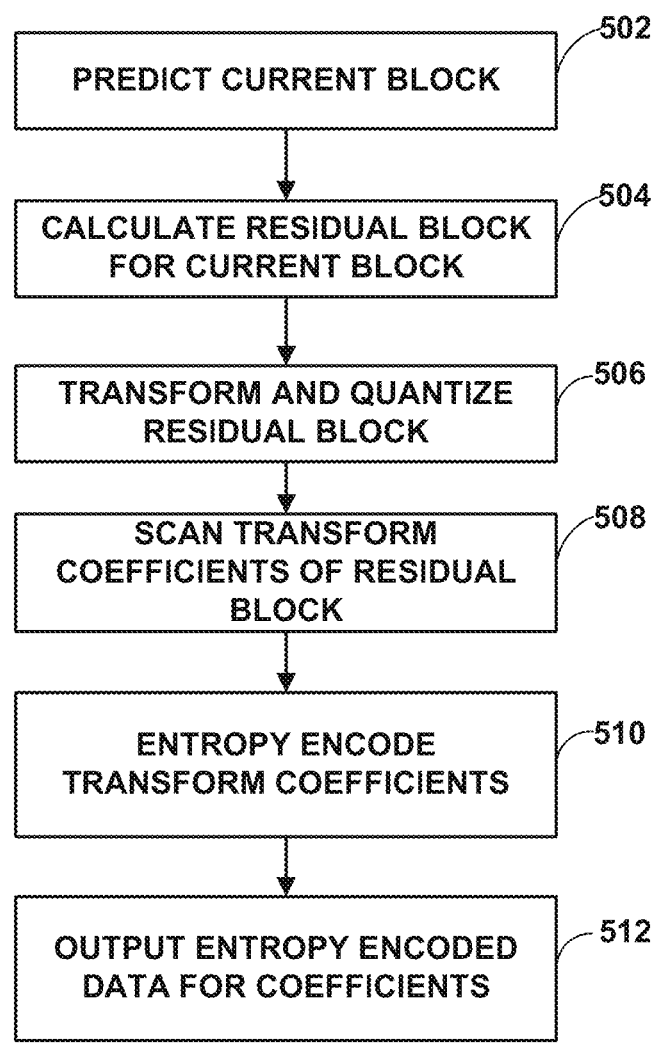
FIG. 10 is a flowchart illustrating an example method for encoding a current block.

FIG. 10 is a flowchart illustrating an example method for encoding a current block. The current block may comprise a current CU. Although described with respect to video encoder 200 (FIGS. 1 and 3), it should be understood that other devices may be configured to perform a method similar to that of FIG. 10.

In this example, mode selection unit 202 of video encoder 200 may predict the current block (502). For example, mode selection unit 202 may form a prediction block for the current block. Residual generation unit 204 of video encoder 200 may calculate a residual block for the current block (504). To calculate the residual block, video encoder 200 may calculate a difference between the original, unencoded block and the prediction block for the current block. Transform processing unit 206 and quantization unit 208 of video encoder 200 may transform and quantize coefficients of the residual block (506). For example, transform processing unit 206 may apply a LFNST using N bins for a LFNST index, where each bin of the N bins is context encoded. Entropy encoding unit 220 of video encoder 200 may scan the quantized transform coefficients of the residual block (508).

During the scan, or following the scan, video encoder 200 may entropy encode the transform coefficients (510). For example, entropy encoding unit 220 may encode the transform coefficients using CAVLC or CABAC. In some examples, entropy encoding unit 220 may context encode each bin of the N bins for the LFNST index. Entropy encoding unit 220 may then output the entropy encoded data of the block (512).

Figure 11:
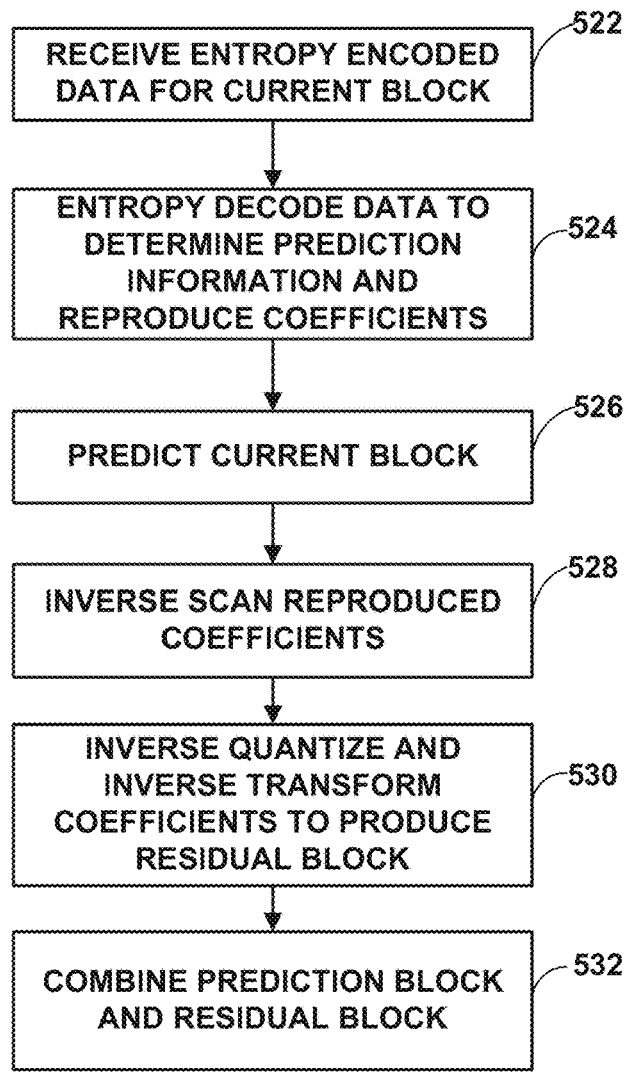
FIG. 11 is a flowchart illustrating an example method for decoding a current block of video data.

FIG. 11 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 11.

Entropy decoding unit 302 of video decoder 300 may receive entropy encoded data for the current block, such as entropy encoded prediction information and entropy encoded data for coefficients of a residual block corresponding to the current block (522). Entropy decoding unit 302 may entropy decode the entropy encoded data to determine prediction information for the current block and to reproduce coefficients of the residual block (524). For example, entropy decoding unit 302 may context decode each bin of N bins for the LFNST index.

Prediction processing unit 304 of video decoder 300 may predict the current block (526), e.g., using an intra- or inter-prediction mode as indicated by the prediction information for the current block, to calculate a prediction block for the current block. Entropy decoding unit 302 may then inverse scan the reproduced coefficients (528), to create a block of quantized transform coefficients. Inverse quantization unit 306 and inverse transform processing unit 308 may inverse quantize and inverse transform the transform coefficients to produce a residual block (530). For example, inverse transform processing unit 308 may apply an inverse LFNST using the N bins for the LFNST index, where each bin of the N bins is context decoded. Reconstruction unit 310 of video decoder 300 may decode the current block by combining the prediction block and the residual block (532).

Figure 12:
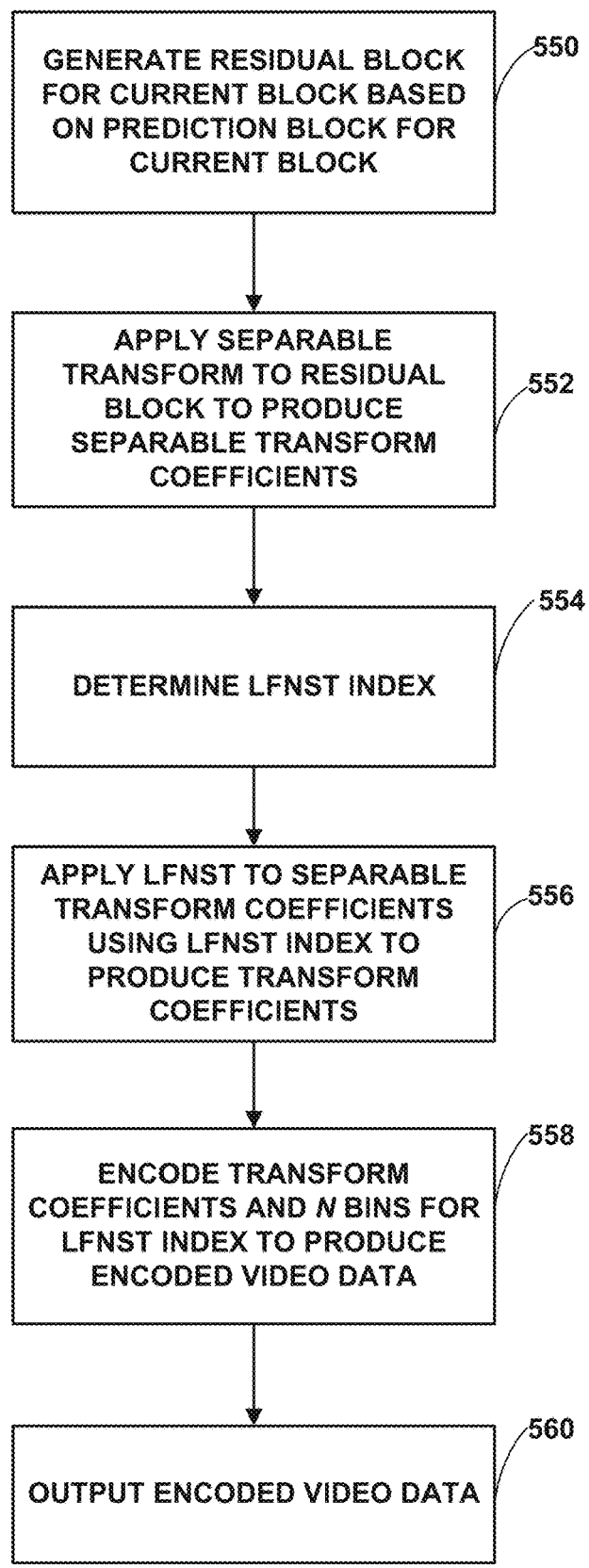
FIG. 12 is a flowchart illustrating an example method for encoding a current block using N bins for a LFNST index.

FIG. 12 is a flowchart illustrating an example method for encoding a current block using N bins for a LFNST index. Although described with respect to video encoder 200 (FIGS. 1 and 3), other devices may be configured to perform a method similar to that of FIG. 12.

A video encoder (e.g., video encoder 200, or more particularly, for example, residual generation unit 204 of video encoder 200) may generate a residual block for a current block based on a prediction block for the current block (550). The video encoder (e.g., video encoder 200, or more particularly, for example, transform processing unit 206 of video encoder 200) may apply a separable transform to the residual block to produce separable transform coefficients (552). The video encoder may determine a LFNST index (554). For example, mode selection unit 202 may determine the LFNST index is '0' when LFNST is disabled, '1' when LFNST is enabled (i.e., not disabled) and a first LFNST type is to be applied, and '2' when LFNST is enabled (i.e., not disabled) and a second LFNST type is to be applied.

The video encoder may apply a LFNST to the separable transform coefficients using the LFNST index to produce transform coefficients (556). For example, transform processing unit 206 may apply the LFNST to the separable transform coefficients configured for the first LFNST type when the LFNST index is '1' and apply the LFNST to the separable transform coefficients configured for the second LFNST type when the LFNST index is '2'.

The video encoder may encode the transform coefficients and N bins for the LFNST index to produce encoded video data (558). The N bins may comprises a first bin and a second bin. To encode the N bins, the video encoder may context encode each bin of the N bins. For example, entropy coding unit 220 may context code a first bin indicating a '0' when the LFNST index is '0' and a '1' when the LFNST index is '1' or '2'. Entropy coding unit 220 may context code a second bin indicating a '0' when the LFNST index is '1' and a '1' when the LFNST index is '2'. The video encoder may output the encoded video data (560).

In some examples, the video encoder may assign a context model for context coding the first bin based on a luma channel. For example, in response to determining that the first bin of the N bins is assigned to a luma channel, the video encoder may encode the first bin of the N bins with a first context. In response to determining that the second bin of the N bins is assigned to a chroma channel, the video encoder may encode the second bin of the N bins with a second context that is different from the first context.

Figure 13:
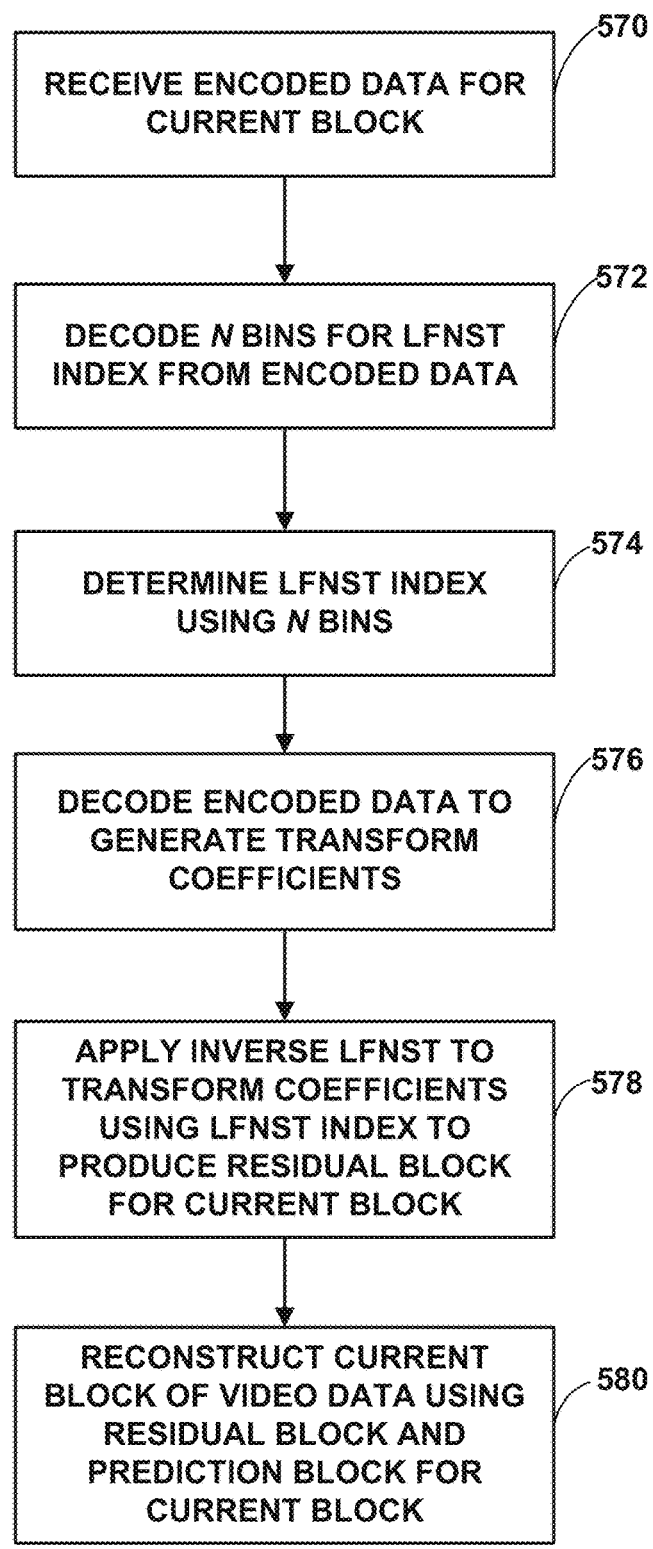
FIG. 13 is a flowchart illustrating an example method for decoding a current block of video data using N bins for a LFNST index.

FIG. 13 is a flowchart illustrating an example method for decoding a current block of video data using N bins for a LFNST index. Although described with respect to video decoder 300 (FIGS. 1 and 4), other devices may be configured to perform a method similar to that of FIG. 13.

A video decoder (e.g., video decoder 300, or more particularly, for example, entropy decoding unit 302 of video encoder 200) may receive encoded data for a current block (570). The video decoder (e.g., video decoder 300, or more particularly, for example, entropy decoding unit 302 of video encoder 200) may decode N bins for a LFNST index from the encoded data (572). The N bins may comprise a first bin and a second bin. To decode the N bins, the video decoder may context decode each bin of the N bins.

The video decoder (e.g., video decoder 300, or more particularly, for example, prediction processing unit 304 of video encoder 200) may determine the LFNST index using the N bins (574). For example, prediction processing unit 304 may determine the LFNST index is '0' when the entropy decoding unit 302 context decodes the first bin as '0', '1' when the entropy decoding unit 302 context decodes the first bin as '1' and the second bin as '0' and '2' when the entropy decoding unit 302 context decodes the first bin as '1' and the second bin as '1'.

The video decoder (e.g., video decoder 300, or more particularly, for example, entropy decoding unit 302 of video encoder 200) may decode the encoded data to generate transform coefficients (576). For example, entropy decoding unit 302 may generate quantized transform coefficients based on the received encoded data, inverse quantization unit 306 may generate the transform coefficients based on the quantized transform coefficients.

The video decoder (e.g., video decoder 300, or more particularly, for example, inverse transform processing unit 308 of video encoder 200) may apply an inverse LFNST to the transform coefficients using the LFNST index to produce a residual block for the current block (578). For example, inverse transform processing unit 308 may apply the inverse LFNST configured for a first LFNST type to the transform coefficient when the LFNST index is '1' and apply the inverse LFNST configured for a second LFNST type to the transform coefficient when the LFNST index is '2'. Inverse transform processing unit 308 may apply an inverse separable transform to the separable transform coefficients output by the inverse LFNST to produce the residual block for the current block. The video decoder (e.g., video decoder 300, or more particularly, for example, reconstruction unit 310 of video encoder 200) may reconstruct the current block of the video data using the residual block and a prediction block for the current block (580).

In some examples, the video decoder may determine a context model for context coding the first bin based on whether the current block is for a luma channel or a chroma channel. For example, in response to determining that the first bin of the N bins is assigned to a luma channel, the video decoder may decode the first bin of the N bins with a first context. In response to determining that the second bin of the N bins is assigned to a chroma channel, the video decoder may decode the second bin of the N bins with a second context that is different from the first context.

A non-limiting illustrative list of examples of the techniques of this disclosure is provided below.

Example 1. A method of decoding video data, the method comprising: receiving entropy encoded data for a current block; entropy decoding N bins for a Low-Frequency Non-Separable Transform (LFNST) flag/index from the entropy encoded data, where N is an integer value greater than 0; determining the LFNST flag/index using the N bins; entropy decoding the entropy encoded data to generate coefficients; applying a LFNST to the coefficients using the LFNST flag/index to produce a residual block; and reconstructing the current block of the video data using the residual block and a predicted block for the current block.

Example 2. A method of encoding video data, the method comprising: generating a residual block using video data for a current block and a predicted block for the current block; determining a Low-Frequency Non-Separable Transform (LFNST) flag/index; applying a LFNST to the residual block using the LFNST flag/index to produce coefficients; entropy encoding the coefficients and N bins for the LFNST flag/index to produce entropy encoded data, where N is an integer value greater than 0; and outputting the entropy encoded data.

Example 3. The method of examples 1 or 2, wherein entropy encoding or decoding N bins comprises: context encoding or decoding each bin of the N bins.

Example 4. The method of examples 1 or 2, wherein entropy encoding or decoding N bins comprises: determining a subset of the N bins from the N bins, the subset of the N bins comprising fewer bins than the N bins; determining a remaining portion of bins from the N bins based on the subset of the N bins, wherein the subset of the N bins and the remaining portion of the bins form the N bins; context encoding or decoding the subset of the N bins; and bypass encoding or decoding the remaining portion of bins from the N bins.

Example 5. The method of examples 1 or 2, wherein entropy encoding or decoding N bins comprises: bypass encoding or decoding each bin of the N bins.

Example 6. The method of any of examples 1-4, wherein entropy encoding or decoding N bins comprises: in response to determining that a first bin of the N bins is assigned to a luma channel, context encoding or decoding the first bin of the N bins with a first context; and in response to determining that a second bin of the N bins is assigned to a chroma channel, context encoding or decoding the second bin of the N bins with a second context that is different from the first context.

Example 7. The method of any of examples 1-4 and 6, wherein entropy encoding or decoding N bins comprises: in response to determining that a first bin of the N bins is assigned to a first block partition mode, context encoding or decoding the first bin of the N bins with a first context; and in response to determining that a second bin of the N bins is assigned to a second block partition mode, context encoding or decoding the second bin of the N bins with a second context that is different from the first context.

Example 8. The method of any of examples 1-4, 6, and 7, wherein entropy encoding or decoding N bins comprises: in response to determining that a first bin of the N bins is assigned to a first intra mode, context encoding or decoding the first bin of the N bins with a first context; and in response to determining that a second bin of the N bins is assigned to a second intra mode, context encoding or decoding the second bin of the N bins with a second context that is different from the first context.

Example 9. The method of any of examples 1-4 and 6-8, wherein entropy encoding or decoding N bins comprises: in response to determining that a first bin of the N bins is assigned to a planar mode, context encoding or decoding the first bin of the N bins with a first context; and in response to determining that a second bin of the N bins is not assigned to the planar mode, context encoding or decoding the second bin of the N bins with a second context that is different from the first context.

Example 10. The method of any of examples 1-4 and 6-9, wherein entropy encoding or decoding N bins comprises: in response to determining that a first bin of the N bins is assigned to a planar mode, context encoding or decoding the first bin of the N bins with a first context; and in response to determining that a second bin of the N bins is assigned to a DC mode, context encoding or decoding the second bin of the N bins with the first context.

Example 11. The method of any of examples 1-4 and 6-10, wherein entropy encoding or decoding N bins comprises: in response to determining that a first bin of the N bins is assigned to a first angular mode that is within a first subset of angular modes, context encoding or decoding the first bin of the N bins with a first context assigned to the first subset of angular modes; in response to determining that a second bin of the N bins is assigned to a second angular mode that is within the first subset of angular modes, context encoding or decoding the second bin of the N bins with the first context; and in response to determining that a third bin of the N bins is assigned to a third angular mode that is within a second subset of angular modes different from the first subset of angular modes, context encoding or decoding the third bin of the N bins with a second context assigned to the second subset of angular modes that is different from the first context.

Example 12. The method of any of examples 1-4 and 6-11, wherein entropy encoding or decoding N bins comprises: using a single context for all intra modes; and predicting or modifying a bin value based on mode information for a respective bin of the N bins.

Example 13. The method of any of examples 1-4 or 6-12, wherein determining the LFNST flag/index comprises: determining a value for an intra mode for decoding the current block; context decoding a value for the last bin of the N bins to generate a decoded value; and predicting the value of the last bin based on the decoded value and the value for the intra mode.

Example 14. The method of example 13, wherein predicting the value of the last bin comprises: determining whether the value for the intra mode is odd; in response to determining that the value for the intra mode is not odd, predicting the value of the last bin as the decoded value; and in response to determining that the value for the intra mode is odd, predicting the value of the last bin as a value opposite to the decoded value.

Example 15. The method of example 13, wherein predicting the value of the last bin comprises: determining whether the value for the intra mode is even; in response to determining that the value for the intra mode is not even, predicting the value of the last bin as the decoded value; and in response to determining that the value for the intra mode is even, predicting the value of the last bin as a value opposite to the decoded value.

Example 16. A device for encoding or decoding video data, the device comprising one or more means for performing the method of any of examples 1-15.

Example 17. The device of example 16, wherein the one or more means comprise one or more processors implemented in circuitry.

Example 18. The device of any of examples 16 and 17, further comprising a memory to store the video data.

Example 19. The device of any of examples 16-18, further comprising a display configured to display decoded video data.

Example 20. The device of any of examples 16-19, wherein the device comprises one or more of a camera, a computer, a mobile device, a broadcast receiver device, or a set-top box.

Example 21. The device of any of examples 16-20, wherein the device comprises a video decoder.

Example 22. The device of any of examples 16-21, wherein the device comprises a video encoder.

Example 23. A computer-readable storage medium having stored thereon instructions that, when executed, cause one or more processors to perform the method of any of examples 1-15.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving encoded data for a current block;
   decoding N bins for a low-frequency non-separable transform (LFNST) index from the encoded data, wherein the N bins comprises a first bin and a second bin and wherein decoding the N bins comprises context decoding at least one bin of the N bins;
   determining the LFNST index using the N bins, wherein determining the LFNST index comprises determining a value for an intra mode for decoding the current block, context decoding a value of the last bin of the N bins to generate a decoded value, and determining the value of the last bin based on the decoded value and the value for the intra mode;
   wherein determining the value of the last bin comprises:
     determining whether the value for the intra mode is odd, in response to determining that the value for the intra mode is not odd, predicting the value of the last bin as the decoded value, and, in response to determining that the value for the intra mode is odd, predicting the value of the last bin as a value opposite to the decoded value; or determining whether the value for the intra mode is even, in response to determining that the value for the intra mode is not even, predicting the value of the last bin as the decoded value, and, in response to determining that the value for the intra mode is even, predicting the value of the last bin as a value opposite to the decoded value;

decoding the encoded data to generate transform coefficients;

applying an inverse LFNST to the transform coefficients using the LFNST index to produce a residual block for the current block; and reconstructing the current block of the video data using the residual block and a prediction block for the current block.

2. The method of claim 1, wherein context decoding comprises:

in response to determining that the first bin of the N bins is assigned to a luma channel, context decoding the first bin of the N bins with a first context; and in response to determining that the second bin of the N bins is assigned to a chroma channel, context decoding the second bin of the N bins with a second context that is different from the first context.

3. The method of claim 1, wherein context decoding comprises:

predicting, using a first context that is the same for a luma channel for all intra modes or using a second context that is the same for a chroma channel for all intra modes, a bin value based on intra mode information for a respective bin of the N bins.

4. A method of encoding video data, the method comprising:

generating a residual block for a current block based on a prediction block for the current block;

applying a separable transform to the residual block to produce separable transform coefficients;

determining a low-frequency non-separable transform (LFNST) index;

applying a LFNST to the separable transform coefficients using the LFNST index to produce transform coefficients;

encoding the transform coefficients and N bins for the LFNST index to produce encoded video data, wherein the N bins comprises a first bin and a second bin and wherein encoding the N bins comprises context encoding at least one bin of the N bins, wherein context encoding, the at least one bin comprises determining a value for an intra mode for encoding the current block and context encoding a value of the last bin of the N bins based on the value for the intra mode;

wherein context encoding the value of the last bin comprises:

determining whether the value for the intra mode is odd, in response to determining that the value for the intra mode is not odd, context encoding the value of the last bin, and, in response to determining that the value for the intra mode is odd, context encoding a value opposite to the value of the last bin; or determining whether the value for the intra mode is even, in response to determining that the value for the intra mode is not even, predicting the value of the last bin as the decoded value, and, in response to determining that the value for the intra mode is even, predicting the value of the last bin as a value opposite to the decoded value; and outputting the encoded video data.

5. The method of claim 4, wherein context encoding comprises:

in response to determining that the first bin of the N bins is assigned to a luma channel, context encoding the first bin of the N bins with a first context; and in response to determining that the second bin of the N bins is assigned to a chroma channel, context encoding the second bin of the N bins with a second context that is different from the first context.

6. The method of claim 4, wherein context encoding comprises:

context encoding, using a first context that is the same for a luma channel for all intra modes or using a second context that is the same for a chroma channel for all intra modes, a bin value based on intra mode information for a respective bin of the N bins.

7. A device for decoding video data, the device comprising one or more processors implemented in circuitry and configured to:

receive encoded data for a current block;

decode N bins for a low-frequency non-separable transform (LFNST) index from the encoded data, wherein the N bins comprises a first bin and a second bin and wherein, to decode the N bins, the one or more processors are configured to context decode at least one bin of the N bins;

determine the LFNST index using the N bins, wherein, to determine the LFNST index, the one or more processors are configured to determine a value for an intra mode for decoding the current block, context decode a value of the last bin of the N bins to generate a decoded value, and determine the value of the last bin based on the decoded value and the value for the intra mode;

wherein, to determine the value of the last bin, the one or more processors are configured to:

determine whether the value for the intra mode is odd, in response to a determination that the value for the intra mode is not odd, predict the value of the last bin as the decoded value, and, in response to a determination that the value for the intra mode is odd, predict the value of the last bin as a value opposite to the decoded value; or determine whether the value for the intra mode is even, in response to determining that the value for the intra mode is not even, predict the value of the last bin as the decoded value, and, in response to determining that the value for the intra mode is even, predict the value of the last bin as a value opposite to the decoded value;

decode the encoded data to generate transform coefficients;

apply an inverse LFNST to the transform coefficients using the LFNST index to produce a residual block for the current block; and reconstruct the current block of the video data using the residual block and a prediction block for the current block.

8. The device of claim 7, wherein, to context decode, the one or more processors are configured to:

in response to a determination that the first bin of the N bins is assigned to a luma channel, context decode the first bin of the N bins with a first context; and in response to a determination that the second bin of the N bins is assigned to a chroma channel, context decode the second bin of the N bins with a second context that is different from the first context.

9. The device of claim 7, wherein, to context decode, the one or more processors are configured to:
predict, using a first context that is the same for a luma channel for all intra modes or using a second context that is the same for a chroma channel for all intra modes, a bin value based on intra mode information for a respective bin of the N bins.

10. The device of claim 7, further comprising a display configured to display the video data.

11. The device of claim 7, wherein the device comprises one or more of a camera, a computer, a mobile device, a broadcast receiver device, or a set-top box.

12. A device for encoding video data, the device comprising one or more processors implemented in circuitry and configured to:
generate a residual block for a current block based on a prediction block for the current block;
apply a separable transform to the residual block to produce separable transform coefficients;
determine a low-frequency non-separable transform (LFNST) index;
apply a LFNST to the separable transform coefficients using the LFNST index to produce transform coefficients;
encode the transform coefficients and N bins for the LFNST index to produce encoded video data, wherein the N bins comprises a first bin and a second bin and wherein, to encode the N bins, the one or more processors are configured to context encode at least one bin of the N bins, wherein, to context encode the at least one bin, the one or more processors are configured to determine a value for an intra mode for encoding the current block and context encode a value of the last bin of the N bins based on the value for the intra mode;
wherein, to context encode the value of the last bin, the one or more processors are configured to:
determine whether the value for the intra mode is odd, in response to a determination that the value for the intra mode is not odd, context encode the value of the last bin, and, in response to a determination that the value for the intra mode is odd, context encode a value opposite to the value of the last bin; or
determine whether the value for the intra mode is even, in response to determining that the value for the intra mode is not even, predict the value of the last bin as the decoded value, and, in response to determining that the value for the intra mode is even, predict the value of the last bin as a value opposite to the decoded value; and
output the encoded video data.

13. The device of claim 12, wherein, to context encode, the one or more processors are configured to:
in response to a determination that the first bin of the N bins is assigned to a luma channel, context encode the first bin of the N bins with a first context; and
in response to a determination that the second bin of the N bins is assigned to a chroma channel, context encode the second bin of the N bins with a second context that is different from the first context.

14. The device of claim 12, wherein, to context encode, the one or more processors are configured to:
context encode, using a first context that is the same for a luma channel for all intra modes or using a second context that is the same a the chroma channel for all intra modes, a bin value based on intra mode information for a respective bin of the N bins.

* * * * *